US012679135B2

(12) United States Patent
Segaert et al.

(10) Patent No.: US 12,679,135 B2
(45) Date of Patent: *Jul. 14, 2026

(54) METHOD FOR THE MANUFACTURE OF PANELS AND PANELS OBTAINED THEREBY

(71) Applicant: UNILIN, BV, Wielsbeke (BE)

(72) Inventors: Martin Segaert, Ypres (BE); Jan De Rick, Geraardsbergen (BE); Christophe Naeyaert, Jabbeke (BE); Benjamin Clement, Waregem (BE); Pieter-Jan Sabbe, Merelbeke (BE); Ward Van Tieghem, Wevelgem (BE); Milan Thoen, Desselgem (BE)

(73) Assignee: UNILIN, BV, Wielsbeke (BE)

(*) Notice: Subject to any disclaimer, the term of this patent is extended or adjusted under 35 U.S.C. 154(b) by 103 days.

This patent is subject to a terminal disclaimer.

(21) Appl. No.: 18/609,215

(22) Filed: Mar. 19, 2024

(65) Prior Publication Data

US 2024/0217262 A1 Jul. 4, 2024

Related U.S. Application Data

(63) Continuation of application No. 18/558,939, filed as application No. PCT/IB2022/053947 on Apr. 28, 2022.

(Continued)

(30) Foreign Application Priority Data

Jun. 3, 2021 (BE) .................................. 2021/5443
Nov. 9, 2021 (BE) .................................. 2021/5869

(51) Int. Cl.
*B44C 5/04* (2006.01)
*C09D 7/20* (2018.01)
(Continued)

(52) U.S. Cl.
CPC .............. *B44C 5/0492* (2013.01); *C09D 7/20* (2018.01); *C09D 133/04* (2013.01);
(Continued)

(58) Field of Classification Search
CPC .......... E04F 15/02033; E04F 15/02038; E04F 15/107; E04F 15/102; E04F 15/02;
(Continued)

(56) References Cited

U.S. PATENT DOCUMENTS 4,337,093 A 6/1982 Metzner et al.
5,064,695 A 11/1991 Hotta et al.
(Continued)

FOREIGN PATENT DOCUMENTS

BE 1017404 A3 8/2008
CN 1684824 A 10/2005
(Continued)

OTHER PUBLICATIONS

Belgian Search Report from corresponding Belgian Patent Application No. BE202105443, Jan. 6, 2022.
(Continued)

*Primary Examiner* — Chi Q Nguyen
(74) *Attorney, Agent, or Firm* — Workman Nydegger

(57) ABSTRACT

A method for manufacturing rectangular panels, wherein the panels have a substrate and a top layer. The panels are provided with a first pair of opposite edges, namely a first edge, and an opposite second edge. The method includes the steps of applying a liquid on at least a part of the first edge. The liquid penetrates the respective edge to a certain depth. The method further includes applying varnish on at least a part of the first edge while the liquid on the first edge is still wet.

24 Claims, 7 Drawing Sheets

Related U.S. Application Data

(60) Provisional application No. 63/184,478, filed on May 5, 2021.

(51) Int. Cl.

| | |
|---|---|
| ***C09D 133/04*** | (2006.01) |
| ***C09D 167/06*** | (2006.01) |
| ***C09D 175/04*** | (2006.01) |
| ***E04F 15/02*** | (2006.01) |
| *E04F 15/10* | (2006.01) |

(52) U.S. Cl.
CPC ......... *C09D 167/06* (2013.01); *C09D 175/04* (2013.01); *E04F 15/02016* (2013.01); *E04F 15/02033* (2013.01); *E04F 15/02038* (2013.01); *E04F 15/107* (2013.01); *E04F 2201/0146* (2013.01); *E04F 2201/0153* (2013.01); *E04F 2201/023* (2013.01); *E04F 2201/042* (2013.01); *E04F 2201/043* (2013.01); *E04F 2201/044* (2013.01)

(58) Field of Classification Search
CPC ......... E04F 15/04; E04F 15/087; E04F 15/10; E04F 15/18; E04F 2201/0115; E04F 2201/042; E04F 2201/0107; E04F 2201/03; E04F 2201/0552; E04F 2201/023; E04F 2201/0525; E04F 2201/0153; E04F 2201/043; E04F 2201/0547; E04F 2201/0138; E04F 2201/0146; B32B 3/06; B32B 3/30; B32B 7/02; B32B 9/005; B32B 9/045; B32B 27/08; B44C 5/0492; C09D 7/20; C09D 133/04; C09D 167/06; C09D 175/04
See application file for complete search history.

(56) References Cited

U.S. PATENT DOCUMENTS

| | | | |
|---|---|---|---|
| 5,593,483 | A | 1/1997 | Brunken |
| 5,755,068 | A * | 5/1998 | Ormiston .......... E04F 15/02033 428/167 |
| 6,136,449 | A | 10/2000 | Furuuchi et al. |
| 6,620,459 | B2 | 9/2003 | Colvin et al. |
| 9,259,959 | B2 | 2/2016 | Clement et al. |
| 9,757,974 | B2 | 9/2017 | Kalwa |
| 9,957,420 | B2 | 5/2018 | Morgeneyer et al. |
| 10,933,686 | B2 * | 3/2021 | Bilodeau ............. B29C 37/0025 |
| 11,141,759 | B2 * | 10/2021 | Pankoke ................... B44C 3/02 |
| 2002/0023702 | A1 | 2/2002 | Kettler |
| 2006/0048675 | A1 | 3/2006 | Krusemann et al. |
| 2006/0130421 | A1 * | 6/2006 | Nollet ....................... B44F 9/02 52/582.1 |
| 2006/0191226 | A1 | 8/2006 | Kim et al. |
| 2007/0160816 | A1 | 7/2007 | Linnemann |
| 2008/0256890 | A1 | 10/2008 | Pervan et al. |
| 2009/0260313 | A1 | 10/2009 | Segaert |
| 2010/0058694 | A1 | 3/2010 | Eiden |
| 2010/0175343 | A1 | 7/2010 | Kruesemann et al. |
| 2011/0200829 | A1 | 8/2011 | Ober et al. |
| 2012/0196035 | A1 | 8/2012 | Deniau et al. |
| 2012/0213973 | A1 | 8/2012 | Clement et al. |
| 2014/0017452 | A1 * | 1/2014 | Pervan ...................... B44C 1/24 427/510 |
| 2018/0155934 | A1 | 6/2018 | D'Hondt et al. |
| 2020/0353722 | A1 * | 11/2020 | Naeyaert ................... B32B 7/12 |

FOREIGN PATENT DOCUMENTS

| | | | |
|---|---|---|---|
| CN | 202039544 | U | 11/2011 |
| DE | 9202976 | U1 | 5/1992 |
| DE | 29610462 | U1 | 8/1996 |
| DE | 102007002395 | A1 | 7/2008 |
| DE | 102007024261 | A1 | 11/2008 |
| DE | 102008011798 | A1 | 9/2009 |
| DE | 102013102351 | A1 | 9/2014 |
| EP | 0022900 | A1 | 1/1981 |
| EP | 0930351 | A1 | 7/1999 |
| EP | 0974713 | A1 | 1/2000 |
| EP | 0988420 | A1 | 3/2000 |
| EP | 1127935 | A1 | 8/2001 |
| EP | 1167654 | A2 | 1/2002 |
| EP | 1210392 | A1 | 6/2002 |
| EP | 1549486 | A1 | 7/2005 |
| EP | 1898024 | A1 | 3/2008 |
| EP | 2828101 | A1 | 1/2015 |
| EP | 2918747 | A1 | 9/2015 |
| EP | 3473783 | A1 | 4/2019 |
| EP | 4446389 | A2 | 10/2024 |
| FR | 2890593 | A1 | 3/2007 |
| JP | H05302270 | A | 11/1993 |
| JP | 3398438 | B2 | 4/2003 |
| JP | 2004358947 | A | 12/2004 |
| JP | 2009269289 | A | 11/2009 |
| WO | 9747834 | A1 | 12/1997 |
| WO | 0222332 | A1 | 3/2002 |
| WO | 02060691 | A1 | 8/2002 |
| WO | 2004016422 | A1 | 2/2004 |
| WO | 2004035276 | A2 | 4/2004 |
| WO | 2004076141 | A2 | 9/2004 |
| WO | 2006088417 | A2 | 8/2006 |
| WO | 2007067648 | A2 | 6/2007 |
| WO | 2007113676 | A2 | 10/2007 |
| WO | 2007123298 | A1 | 11/2007 |
| WO | 2008017689 | A1 | 2/2008 |
| WO | 2008078181 | A1 | 7/2008 |
| WO | 2010055429 | A2 | 5/2010 |
| WO | 2010088769 | A1 | 8/2010 |
| WO | 2012049577 | A2 | 4/2012 |
| WO | 2012115898 | A1 | 8/2012 |
| WO | 2013068298 | A1 | 5/2013 |
| WO | 2014090939 | A1 | 6/2014 |
| WO | 2019060972 | A1 | 4/2019 |

OTHER PUBLICATIONS

International Search Report from corresponding PCT Application No. PCT/IB2022/053947, Aug. 1, 2022.

* cited by examiner

METHOD FOR THE MANUFACTURE OF PANELS AND PANELS OBTAINED THEREBY

BACKGROUND

The present invention relates to a method for the manufacture of panels; and to panels—for example floor panels—obtained by these methods.

In particular the invention relates to panels that are used for assembling for example a floating floor covering. Floor panels of this kind are known for example from WO97/47834 and may be provided on two opposite edges with profiled edge regions that comprise milled coupling means that fit into one another, with which two floor panels of this kind can be coupled together on the respective edges, preferably without using glue. Optionally the coupling means may be configured with some pretension, which means that the contour of the coupling means is configured as somewhat overlapping, so that in the coupled state a stress arises that pushes the panels together. This pretension is advantageous for counteracting the formation of gaps after laying. The penetration of dust and moisture may also be limited thereby. In some cases the milling quality of the coupling means is insufficient to keep the seams permanently waterproof. Moreover, at the location of the corner points of such panels there is increased susceptibility to water penetration. The profiled edge regions of adjacent lateral edges cross at the location of the corners, and therefore it is possible that the milled coupling means may be absent or insufficient there.

The penetration of moisture into the seams of a floor covering that is assembled from panels may, in the case of panels with a moisture-sensitive substrate and/or top layer, such as a substrate based on MDF or HDF (medium or high density fibreboard), lead to swelling and/or discoloration, which may be annoyingly visible on the decorative surface of such panels. In addition, such swelling of the substrate may in itself lead to accelerated wear of the floor surface. Furthermore, the penetration of moisture in the seams of a floor covering is problematic per se, even if neither the substrate nor the top layer is moisture-sensitive. In such cases water may collect under the floor covering and this may give rise to mould formation and the unpleasant effects of that.

It is known from WO2008/078181 to treat the edges of a floor panel with an MDF or HDF substrate with a water-repellent substance that comprises a fluorinated polymer or copolymer. The substance in question is applied on the edge of the floor panel by means of a so-called Vacumate, for example of the type as known from DE9202976U1.

SUMMARY

The present invention aims firstly to offer alternative methods for manufacturing panels, wherein according to various preferred embodiments, a solution can be offered for one or more of the problems with the methods and/or panels from the prior art. In particular, one aim of the invention is to describe methods that allow optimal water resistance of panels to be obtained more easily.

The first aspect of the invention relates to a method for the manufacture of panels, wherein the panels are rectangular, either square or oblong, wherein the panels comprise a substrate and a top layer, wherein the panels are provided with a first pair of opposite edges, namely a first edge and an opposite second edge. The method comprises the steps:

applying a liquid on at least a part of the first edge, preferably wherein this liquid penetrates into the respective edge to a certain depth, applying a lacquer on at least a part of the first edge while the liquid on the first edge is still in the wet state.

The invention has the advantage that panels are obtained that are more water-repellent, and are easier to produce.

The fact that the liquid can penetrate after the lacquer is applied wet-on-wet on the chamfer ensures that the chamfer is also made very water-repellent, even in the case of a milled chamfer wherein milling takes place in the substrate of the panel, so that the substrate becomes exposed on the surface of the chamfer.

Wet-on-wet application has the further advantage that better adhesion of the lacquer is obtained.

Preferably application of the liquid and application of the lacquer are carried out in the same continuous process. As a result, even better results are achieved in relation to water repellence and efficiency in production.

Preferably the lacquer is applied at least partly on a surface of the first edge on which liquid has been applied. The liquid has had a moistening effect, so that better adhesion of the lacquer is obtained.

Preferably the lacquer is applied by means of one of the methods:

spraying of the lacquer, applying the lacquer by means of a transfer roller, or applying by means of a vacuum technique. Application by a vacuum technique may for example be carried out as described in DE9202976U1.

Preferably the method comprises, after application of the lacquer, the step of blowing away, sucking away, or combined blowing away and sucking away of wet lacquer that had been applied on the upper surface of the panel during application of the lacquer on the first edge.

Such embodiments have the advantage that adhesion of lacquer on the upper surface of the panel is avoided. This upper surface usually comprises a decorative layer. Lacquer on this upper surface is a defect. If the edge of the panel comprises chamfers, it may be desirable to provide these with lacquer, for example to colour the chamfer. However, this lacquer should preferably not extend as far as the upper surface of the panel.

Preferably, after application of the lacquer the lacquer is dried. This drying is preferably carried out in the same continuous process as application of the lacquer. Preferably, during drying of the lacquer, the liquid is also dried. Efficient finishing of the panel is obtained thereby.

Preferably the lacquer is dried by means of one or more IR lamps (infrared lamps), preferably by means of one or more HIR lamps (halogen infrared lamps). Infrared lamps, and in particular halogen infrared (HIR) lamps have proved to be very effective in this process step.

Preferably during drying, a continuous gas stream—preferably a continuous air stream—flows over the surface of the panel to be dried. More preferably, this gas stream is produced by means of a blowing device and/or a suction device. Such embodiments have the advantage that the concentration of any solvent evaporating from the liquid and/or the lacquer layer remains low, so that there is no risk of explosion or fire. A safe production process is obtained thereby.

In one embodiment the lacquer is dried by means of a hot gas stream—preferably by means of a hot air stream—wherein during this drying, the hot gas stream flows continuously over the surface of the panel to be dried. More preferably, this gas stream is produced by means of a blowing device and/or a suction device. This embodiment has the advantage that the concentration of any solvent evaporating from the liquid and/or the lacquer layer remains low, so that there is no risk of explosion or fire. Safe production is obtained thereby.

Preferably the lacquer is pigmented and/or the lacquer contains colourants. When the lacquer is placed on a chamfer of the panel, this allows a suitable colour to be given to the chamfer. This is especially important when the chamfer has been produced by means of a cutting process into the substrate of the panel.

Preferably the lacquer is a water-based dispersion. More preferably the lacquer is an acrylate dispersion or a polyurethane dispersion, or the lacquer is or comprises an alkyd resin. The lacquer may also be solvent-based, preferably a solvent-based acrylate or a solvent-based polyurethane lacquer.

In embodiments where an alkyd is used, the alkyd is preferably of the long-chain type.

In preferred embodiments the liquid is solvent-based, or the liquid is water-based.

Solvent-based liquids have the advantage when used on panels wherein the substrate is wood-based (for example wherein the substrate is or comprises an MDF or HDF board) that on application of the liquid, the wood fibres will not stand up, as would be the case with a water-based liquid. Wood fibres that stand up are on the one hand disadvantageous for preventing water absorption; and on the other hand disadvantageous because this may lead to greater roughness on the edges of the panel. The greater roughness may disturb the close tolerances of coupling parts at the edges; this is disadvantageous for coupling the panels during installation of the panels in a covering, e.g. in a floor covering.

In a preferred embodiment of the invention the liquid is solvent-based. The solvent comprises one or more of a glycol ether, propylene glycol methyl ether, propylene glycol methyl ether acetate, hydrocarbons—preferably aliphatic hydrocarbons and/or preferably iso-hydrocarbons —, butyl acetate, propyl acetate—for example 3-methoxy-3-methyl-1-butyl acetate (MMB-AC) or 1-methoxy-propyl acetate (MPA)-, a dibasic ester, a glycol diether, a benzoate ester, or a tetramethoxy ether.

The use of such solvents is preferred because good stability of the liquid is obtained, necessary for the processability thereof; and because good impregnation of the edge(s) of the panel with the liquid is obtained.

In preferred embodiments the liquid is solvent-based, wherein the solvent has a flash point above 30° C., more preferably above 35° C., even more preferably above 55° ° C. Such embodiments increase safety when carrying out the invention.

Preferably the liquid comprises one or more of an acrylate, a methacrylate, a fluorinated acrylate, a fluorinated methacrylate, a fluorinated acrylate copolymer, a (per)fluoroalkyl (meth)acrylate or a (per)fluoroalky (meth)acrylate copolymer, an alkyd, an epoxy resin, a fluorinated epoxy resin, a styrene acrylate, a urethane acrylate, an alkyd modified with polyurethane, an alkyd modified with fluorine, a styrene butadiene co-polymer or a polysiloxane. When a (per)fluoroalkyl (meth)acrylate or a (per)fluoroalky (meth)acrylate copolymer is used, the fluorinated side chains preferably comprise four, five or six carbon atoms that comprise fluorine atoms and/or at least a proportion of the fluorinated side groups are based on perfluorobutane sulphonic acid. Such products have proved to be very efficient.

The—at least partial—use of a fluorinated methacrylate, for example as a component in a fluorinated acrylate copolymer—has the advantage that the impregnating agent has better adhesion with the substrate.

The combination—especially of the stated fluorinated acrylate, fluorinated methacrylate, fluorinated acrylate copolymer, (per)fluoroalkyl (meth)acrylate or (per)fluoroalky (meth)acrylate copolymer—with alkyd has proved to be especially advantageous for obtaining water repellence at the edge(s) of the panel.

In a preferred embodiment of the invention the liquid comprises a fluoracrylate polymer with the structural formula

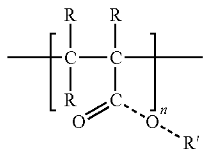

wherein one or more of the R groups are fluorine atoms, and the other R groups are hydrogen atoms;

or a fluoracrylate polymer with the structural formula

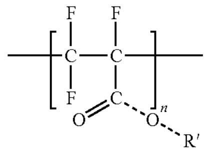

wherein, preferably, the R' group is free from hydrogen atoms, and is preferably selected from the list consisting of sodium, potassium, and $CF_3$.

In a preferred embodiment of the invention the liquid imparts water-repellent properties to the edge on which this liquid is applied.

Preferably the liquid is applied by means of one of the following methods:

spraying on, preferably at a pressure above 3 bar, more preferably at a pressure above 5 bar, applying by means of a transfer roller, or applying by means of a vacuum technique, for example as described in DE9202976U1.

Spraying-on is preferred, because in this way more liquid can be applied.

The embodiment wherein the liquid is sprayed on the respective edge at a pressure above 3 bar has the specific advantage that better penetration into the respective edge of the panel is obtained. The panel becomes more water-repellent as a result.

In preferred embodiments of the invention the first edge comprises a lateral edge of the panel and a chamfer. During application of the liquid, the liquid is applied at least on a part of the lateral edge of the first edge, and during application of the lacquer, the lacquer is applied at least on a part—and preferably on the whole—chamfer of the first edge.

According to this embodiment, a lacquer is applied on the chamfer. This is especially important in the case of chamfers that are produced in the substrate by means of a cutting process, so that in this embodiment a desired coloration and desired properties can be imparted to these chamfers.

More preferably, during application of the liquid on at least a part of the lateral edge of the first edge, liquid is also applied on at least a part of the—and preferably on the entire—chamfer of the first edge, so that on application of the lacquer on the chamfer of the first edge this takes place while the liquid on the chamfer of the first edge is still in the wet state.

In such embodiments both liquid and lacquer are thus applied on the chamfer. A more water-repellent effect of the chamfer is obtained thereby. Owing to the first moistening of the chamfer with the liquid, better adhesion of the lacquer on the chamfer is obtained.

Preferably, the chamfer on the first edge is formed in a continuous process—preferably by processing by mechanical cutting, more preferably by a milling operation—wherein application of the liquid and application of the lacquer are carried out in the same continuous process.

Preferably the chamfer does not comprise the top layer at least over part of its surface, so that over at least a part of the surface of the chamfer the lacquer is applied on the substrate.

Preferably the lateral edge of the first edge comprises a sealing face substantially perpendicular to the upper surface of the panel, and the second edge comprises a lateral edge wherein the lateral edge of the second edge comprises a sealing face substantially perpendicular to the upper surface of the panel. The first edge of the panel may be coupled to the second edge of another such panel, wherein in the coupled state the sealing face of the first edge of the panel is in contact with or is close to the sealing face of the second edge of the other such panel. During application of the liquid, the liquid is applied on at least a part—and preferably on the entire surface of—the sealing face of the first edge.

Through the contact of or the proximity of the sealing faces, even better water resistance of a covering with such panels is obtained.

Preferably in line with—and more preferably parallel with—the carrying out of a step in the method on the first edge, a similar or the same step is carried out on the second edge of the panel. More preferably this takes place for several or for all of the steps stated in the method.

In such embodiments, similar or the same steps are thus carried out on the second edge as on the first edge. This can preferably be carried out in a continuous production process, wherein steps are carried out on the first edge, and at the same time on the second edge. The entire method—on both edges of the first pair of opposite edges—can be carried out on a two-sided continuous milling machine, wherein application of liquid and lacquer—and optional drying thereof—take place in line with the milling operations on the first pair of opposite edges (for example for forming coupling parts and/or chamfers), and at the same time on the first edge and the second edge.

In a preferred embodiment the panels comprise coupling parts on their first pair of opposite edges, wherein the coupling parts comprise locking elements, so that the panel can be coupled on its first edge to the second edge of another such panel, wherein in the coupled state, locking occurs in the direction perpendicular to the surface of the coupled panels and locking also occurs in the plane of the coupled panels and perpendicular to the coupled edges. Preferably the coupling parts on the first pair of opposite edges are configured as overlapping, so that during coupling on the first pair of opposite edges, coupling with pretension is obtained.

In such embodiments, better water resistance of a covering with such panels is obtained synergistically.

When using coupling with pretension, the edges of the panels are pushed together; this impedes moisture penetration at the edges of the coupled panels.

Preferably, application of a liquid on at least a part of the first edge is carried out after and in line with the cutting operations—preferably milling operations—for making the coupling parts on the first edge of the panel.

Preferably the top layer comprises a decorative layer and a wearing layer, for example wherein the decorative layer comprises a printed layer of paper or a printed polymer film.

The second aspect of the invention relates to a method for the manufacture of panels. Optionally this method is a method according to any embodiment of the first aspect of the invention. The panels are rectangular, either square or oblong, wherein the panels comprise a substrate and a top layer, wherein the panels are provided with a first pair of opposite edges, namely a first edge and an opposite second edge. The panels are provided with a second pair of opposite edges, namely a third edge and an opposite fourth edge. The method comprises the step of applying a liquid on at least a part of one, several or all of the first edge, the second edge, the third edge and the fourth edge by means of one or more spray heads, wherein the liquid leaves the one or more spray heads at a pressure above 3 bar, preferably above 4 bar, more preferably above 5 bar. The stated value for the pressure relates to the pressure on exit of the liquid from the spray head.

The second aspect of the invention offers the advantage that better impregnation of the edge(s) of the panel with the liquid is obtained, so that better water repellence of these edges—and of the whole panel—is obtained.

The third aspect of the invention relates to a method for the manufacture of panels, optionally a method such as in any embodiment of the first and/or second aspect of the invention. The panels are rectangular, either square or oblong, wherein the panels comprise a substrate and a top layer. The panels are provided with a first pair of opposite edges, namely a first edge and an opposite second edge. The method comprises the step of applying a liquid on at least a part of the first edge and/or of the second edge by means of one or more spray heads while the panels are led successively past the one or more spray heads. Preferably this takes place with a clearance between successive panels. Preferably this takes place at a constant speed. The position of the panels is detected directly or indirectly by means of a sensor, wherein the signal from the sensor—optionally together with the feed speed of the panels and/or the length of the panels in the direction of feed—is used for controlling, via a controller, the starting and stopping of the spraying of the one or more spray heads.

In this way, a very efficient process is obtained for making the edges of the panels water-repellent.

In a preferred embodiment of the third aspect of the invention, at least two spray heads are controlled for applying, at least partly, liquid on the same surface. This makes it possible to control the amount of liquid applied and to apply more on zones along the length of the edge(s) of the panel that are more critical for the penetration of water.

In a preferred embodiment of the third aspect of the invention, at least one of the spray heads is controlled for applying, also at least partly, liquid on an adjacent edge of the edge on which the spray head applies liquid. This means that extra liquid will be applied on and near the corner points of the panel. These corner points are the most critical for penetration of moisture once panels are installed. Therefore, according to this embodiment, better water resistance is obtained for coverings (e.g. floor coverings) with panels made according to this embodiment.

The fourth aspect of the invention relates to a method for the manufacture of panels. Optionally this method is a method according to any embodiment of the first aspect and/or second aspect and/or third aspect of the invention. The panels are rectangular, either square or oblong, wherein the panels comprise a substrate and a top layer, wherein the panels are provided with a first pair of opposite edges, namely a first edge and an opposite second edge. The method comprises the step of applying a liquid on at least a part of the first edge or of the second edge by means of at least two spray heads while the panels are led successively past the at least two spray heads. Preferably the panels are led successively past the one or more spray heads with a clearance between successive panels. Preferably the panels are led at constant speed past the one or more spray heads. At least one of the at least two spray heads is seen in the projection on the plane of panel at an angle adjusted relative to the plane of the panel, wherein this angle is less than 90°.

Because the spray head is set at an angle of less than 90° to the respective edge, this spray head can treat, also at least partially, an adjacent lateral edge, including the corner between these lateral edges. Therefore, a more water-repellent effect can be obtained, especially at the corners of the panels. This is important because the corners of the panels are the most critical.

In this way, both lateral edges that are adjacent to the respective lateral edge can be treated or covered, at least partially. In addition, the respective corners between the respective lateral edge and the adjacent lateral edges can also be treated or covered by this applicator.

Preferably two of the at least two spray heads are set up so that a first spray head thereof is active in a direction with a component that is opposite to the direction of feed of the aforementioned panel; and a second spray head thereof is active in a direction with a component parallel to the direction of feed of the aforementioned panel.

In this way, both lateral edges that are adjacent to the respective edge can be treated, at least partially. In addition, the respective corners—which form the most critical zone—receive extra treatment.

Furthermore, the control of the spray heads can be improved, so that the complete edge can be treated with liquid most efficiently.

Preferably at least two spray heads are used, wherein these two spray heads apply liquid at least partly on the same surface. This allows the amount of liquid applied to be optimized locally as a function of the risk that there could be water penetration at that location along the edge or edges of the panel. It may for example be useful to apply an extra amount of liquid at the corner points or around the corner points, since the corner points may form critical zones with respect to penetration of moisture.

Preferably at least one of the spray heads is operated to apply, also at least partly, liquid on an adjacent edge of the edge on which the spray head applies liquid.

This makes it possible to apply an extra amount of liquid on the corner points and near the corner points, so that these critical zones are better protected against the penetration of moisture into the installed panels.

The fifth aspect of the invention relates to a method for the manufacture of panels. Optionally this method is a method such as in any embodiment of the first aspect and/or the second aspect, and/or the third aspect and/or the fourth aspect of the invention. The panels are rectangular, either square or oblong, wherein the panels comprise a substrate and a top layer. The panels are provided with a first pair of opposite edges, namely a first edge and an opposite second edge. The method comprises the step of applying a liquid on at least a part of the first edge and/or of the second edge by means of at least one spray head while the panels are led successively past the one or more spray heads. Preferably the panels are led successively past the one or more spray heads with a clearance between successive panels. Preferably the panels are led at constant speed past the one or more spray heads. At least one of the at least one spray head is seen in the projection on the plane perpendicular to the first edge and perpendicular to the direction of feed of the panels at an angle of at least 2 degrees, preferably at least 5 degrees and more preferably less than 15 degrees, adjusted relative to the plane of the panel.

The method according to the fifth aspect of the invention allows, besides optionally present sealing faces, also the optionally present coupling parts and especially the optionally present lowered edge regions (for example chamfers) to be treated well with liquid, so that an optimum water-repellent effect is obtained.

In a preferred embodiment of the second aspect of the invention and/or third aspect of the invention and/or fourth aspect of the invention and/or fifth aspect of the invention, at least one spray head also applies liquid on at least a part of an adjacent edge of the edge on which the spray head applies liquid.

The sixth aspect of the invention relates to a method for the manufacture of panels. Optionally this is a method according to any embodiment of the first aspect and/or second aspect and/or third aspect and/or fourth aspect and/or fifth aspect of the invention. The panels are rectangular, either square or oblong, wherein the panels comprise a substrate and a top layer. The panels are provided with a first pair of opposite edges, namely a first edge and an opposite second edge, wherein the panels can be coupled at their first edge to the second edge of another such panel, wherein the first edge is provided with a lowered edge region and a sealing face substantially perpendicular to the surface of the panel; wherein the second edge is provided with a lowered edge region and a sealing face substantially perpendicular to the surface of the panel; wherein in the coupled state of the panel with its first edge coupled to the second edge of another such panel, the sealing face of the first edge of the panel is in contact with or is close to the sealing face of the second edge of the other such panel. The method comprises the step of applying a liquid on the first edge and on the second edge, wherein the liquid penetrates at least partially into the scaling face of the first edge and into the sealing face of the second edge; wherein the liquid at least forms a film on the lowered edge regions of the first edge and of the second edge. The lowered edge regions may for example be provided in the form of chamfers.

The sixth aspect of the invention offers the advantage that by application of the liquid, two aims are achieved. On the one hand, the edges, including the sealing faces of the edges, can be provided with water-repellent properties. On the other hand, a film is formed on the lowered edge regions. If the liquid comprises pigments or colourants, a coloured film is placed on the lowered edge regions. This is especially useful when the lowered edge regions are formed into the substrate by mechanical cutting operations. The method according to the sixth aspect of the invention makes it superfluous for an additional lacquer or layering to be applied on the lowered edge regions in order to obtain the desired visual effect on these lowered edge regions.

In a preferred embodiment of the sixth aspect of the invention the liquid comprises a pigment or colourant, so that a coloured film is formed on the lowered edge regions—for example formed by chamfers—of the first edge and of the second edge.

In a preferred embodiment of the sixth aspect of the invention, on the lowered edge regions—for example formed by chamfers—the liquid is applied directly on the substrate at least for a part of the surface of the lowered edge regions.

In a preferred embodiment of the sixth aspect of the invention, on the lowered edge regions—for example formed by chamfers—the liquid penetrates into the substrate at least for a part of the surface of the lowered edge regions.

In a preferred embodiment of the sixth aspect of the invention, no layering other than the liquid is applied on the lowered edge regions, which for example are formed by chamfers.

The seventh aspect of the invention relates to a method for the manufacture of panels. Optionally this is a method such as in the first aspect and/or second aspect and/or third aspect and/or fourth aspect and/or fifth aspect and/or sixth aspect of the invention. The panels are rectangular, either square or oblong, wherein the panels comprise a substrate and a top layer, wherein the panels are provided with a first pair of opposite edges, namely a first edge and an opposite second edge; wherein the panels are provided with a second pair of opposite edges, namely a third edge and an opposite fourth edge. The panels are provided with coupling parts on their first pair of opposite edges, so that a first such panel can be coupled on its first edge to the second edge of another such panel, preferably wherein locking occurs in the direction perpendicular to the coupled panels and/or in the direction in the plane of the panels perpendicular to the coupled edges. The method comprises the steps:

- step 1: applying a liquid on at least a part—and preferably over the full length—of the first edge and/or on a part—and preferably over the full length—of the second edge, preferably wherein this liquid penetrates into the respective edge to a certain depth;
- step 2: by means of one or more cutting operations, producing coupling parts on the second pair of opposite edges, so that a first such panel can be coupled on its third edge to the fourth edge of another such panel, preferably wherein locking occurs in the direction perpendicular to the coupled panels and/or in the direction in the plane of the panels perpendicular to the coupled edges;
- and optionally step 3: applying a liquid on at least a part—and preferably over the full length—of the third edge and/or on a part—and preferably over the full length—of the fourth edge, preferably wherein this liquid penetrates into the respective edge to a certain depth. Preferably wherein on the third edge and the fourth edge, per unit of surface area, more liquid is applied than in step 1 on the first edge and the second edge.

The method according to the seventh aspect of the invention makes it possible firstly to carry out processing steps on the first pair of opposite edges, including the mechanical processing operations for forming the coupling parts on the first pair of opposite edges and application of the liquid (this can all take place in a continuous process); and then carry out the processing on the second pair of opposite edges. This facilitates the material flow and the number of manipulations of the panels between process steps.

In a preferred embodiment of the method according to the seventh aspect of the invention wherein step 3 is carried out, in step 3 liquid is also applied on the first edge and/or on the second edge over a certain length from the corner point with an edge of the second pair of opposite edges on which liquid is applied in step 3.

This embodiment is advantageous because the edges are provided with extra liquid near the corner points of the panel, so that the corners of the panels, which form critical zones in a covering with the panels, are also made properly water-repellent.

The preferred embodiment wherein on the third edge and the fourth edge, per unit of surface area, more liquid is applied than in step 1 on the first edge and the second edge, has the advantage that the second pair of opposite edges, which are usually the short edges of an elongated rectangular panel, are made more waterproof. This may be useful in embodiments of coupling parts wherein less pretension is present on the short edges; for example, when the locking perpendicular to the panels is formed by an insert.

In a preferred embodiment of the method according to the seventh aspect of the invention, wherein the first edge and/or the second edge comprise a lowered edge region, preferably in the form of a chamfer, a lacquer is applied on this lowered edge region before or after step 1, but preferably before step 2. Preferably this lacquer is an acrylate lacquer or a polyurethane lacquer; or this lacquer is or comprises an alkyd. Preferably the lacquer comprises pigments or colourants so that the lowered edge regions are coloured.

Preferably, application of the lacquer is followed by blowing away and/or sucking away of any lacquer that would be applied on the upper surface of the panel before step 2. This avoids any lacquer adhering to the decorative upper surface of the panel; this would form a defect.

Preferably the lacquer is dried before carrying out step 2. This prevents dust or chips from adhering in the lacquer layer, which would mean that a good-quality lacquer layer would not be obtained.

The eighth aspect of the invention relates to a method for the manufacture of panels. Optionally this method is a method according to any embodiment of the second aspect and/or the third aspect and/or fourth aspect and/or fifth aspect and/or seventh aspect of the invention. The panels are rectangular, either square or oblong, wherein the panels comprise a substrate and a top layer, wherein the panels are provided with a first pair of opposite edges, namely a first edge and an opposite second edge, wherein the first edge and/or the second edge comprise a lowered edge region, for example a chamfer, wherein the method comprises the steps:

- applying a lacquer on the surface of the lowered edge region(s);
- optionally drying—and optionally crosslinking—of the lacquer on the lowered edge region(s);
- applying a liquid at least on the part of the first edge and/or second edge directly adjacent to the lowered edge region(s), preferably wherein this liquid penetrates to a certain depth (D) in the respective edge.

The method of the eighth aspect makes it possible to obtain a good lacquer layer on the lowered edge regions, which imparts a certain visual aspect to the lowered edge regions, and also to apply a liquid so that the edges of the panels are made water-repellent.

In a preferred embodiment of the eighth aspect of the invention the liquid penetrates at least partially into the respective edge so that a part of the liquid is located in the substrate under the lacquer on the lowered edge region.

As a result, an extra water-repellent effect is also obtained on the lowered edge regions.

In a preferred embodiment of the eighth aspect of the invention, the lateral edge of the first edge comprises a sealing face substantially perpendicular to the upper surface of the panel, and the second edge comprises a lateral edge, wherein the lateral edge of the second edge comprises a sealing face substantially perpendicular to the upper surface of the panel, wherein the first edge of the panel can be coupled to the second edge of another such panel, wherein in the coupled state the sealing face of the first edge of the panel is in contact with or is close to the sealing face of the second edge of the other such panel; wherein during application of the liquid, the liquid is applied on at least a part—and preferably on the entire surface—of the sealing face of the first edge and/or of the second edge.

By applying liquid on these sealing faces, a covering is formed with such panels with extra protection against penetration of moisture into the panels.

Preferably the sealing face of the first edge is directly adjacent to the lowered edge region of the first edge, and the sealing face of the second edge is directly adjacent to the lowered edge region of the second edge, wherein liquid is also applied on the part of the sealing face(s) directly adjacent to the lowered edge region(s) on which liquid is applied.

As a result, a covering is formed with panels produced according to this embodiment, with extra protection against penetration of moisture into the panels.

The ninth aspect of the invention relates to a method for the manufacture of panels. Optionally the method according to the ninth aspect of the invention is a method according to any embodiment of the first aspect and/or second aspect and/or third aspect and/or fourth aspect and/or fifth aspect and/or sixth aspect and/or seventh aspect and/or eighth aspect of the invention. The panels are rectangular, either square or oblong, and comprise a substrate and a top layer. The panels are provided with a first pair of opposite edges, namely a first edge and an opposite second edge, wherein the panels are provided with a second pair of opposite edges, namely a second edge and an opposite fourth edge, wherein on at least one of the first edge, the second edge, the third edge and the fourth edge—and preferably on several of these edges; and more preferably on all of these edges—over at least a part of their surface, and preferably over their entire surface, a liquid is applied; wherein a plurality of these panels are packed together without an active drying treatment being carried after application of the liquid.

The method according to the ninth aspect of the invention offers a very efficient and effective method for making panels water-repellent. No energy is required for carrying out drying.

In a preferred embodiment of the ninth aspect of the invention a plurality of these panels are packed together after application of the liquid before the liquid has dried completely. Drying of the liquid, wherein solvent evaporates, can take place in the packaging. Thus, no energy has to be used to dry the liquid.

The tenth aspect of the invention relates to a method for the manufacture of panels. Optionally this is a method according to any embodiment of the first aspect and/or second aspect and/or third aspect and/or fourth aspect and/or fifth aspect and/or sixth aspect and/or seventh aspect and/or eighth aspect and/or ninth aspect of the invention. The panels are rectangular, either square or oblong, wherein the panels comprise a substrate and a top layer, wherein the panels are provided with a first pair of opposite edges, namely a first edge and an opposite second edge, wherein the method comprises the step of wet application of a film-forming polymer layer or film-forming resin layer at least on one of the first edge or the second edge, wherein this film-forming polymer layer or film-forming resin layer makes the respective edge(s) vapour-tight.

The film provides a barrier against the penetration of moisture at the edges of the panels. This film not only provides a barrier against liquid moisture, but also against vapour, for example at high air humidity.

In a preferred embodiment of the tenth aspect of the invention the method comprises the step of applying a liquid at least on one of the first edge or the second edge, wherein this liquid makes the respective edge(s) water-repellent. Preferably, liquid is applied on a surface on which the film-forming polymer layer or the film-forming resin layer has already been applied.

Besides formation of a barrier against moisture, water repellence is also obtained in this embodiment.

The eleventh aspect of the invention relates to a method for the manufacture of panels. Optionally this is a method according to any embodiment of the first aspect and/or second aspect and/or third aspect and/or fourth aspect and/or fifth aspect and/or sixth aspect and/or seventh aspect and/or eighth aspect and/or ninth aspect of the invention. The panels are rectangular, either square or oblong, wherein the panels comprise a substrate and a top layer, wherein the panels are provided with a first pair of opposite edges, namely a first edge and an opposite second edge, wherein the method comprises the steps:

- applying a liquid on the first edge and/or the second edge, wherein this liquid penetrates to a certain depth in the respective edge;
- wet application of a film-forming polymer layer or film-forming resin layer on the edge or edges on which the liquid has been applied.

In this way, panels are obtained that have good resistance not only to the penetration of liquid moisture, but also to absorption of moisture in vapour form. The edges of the panels also have good water repellence.

In a preferred embodiment of the eleventh aspect of the invention, the liquid imparts water-repellent properties to the respective edge.

In a preferred embodiment of the eleventh aspect of the invention, the polymer film or the film-forming resin layer makes the respective edge vapour-tight.

In a preferred embodiment of the eleventh aspect of the invention, the liquid is water-based or solvent-based.

In a preferred embodiment of the eleventh aspect of the invention, wet application of the polymer film or film-forming resin layer is water-based or solvent-based.

In a preferred embodiment of the tenth aspect and/or eleventh aspect of the invention, the film-forming polymer layer or the film-forming resin layer forms a film with a thickness less than 50 micrometres, preferably less than 25 micrometres.

This is especially important when the panels comprise coupling parts, and even more so when the panels comprise coupling parts that provide mechanical locking in the directions perpendicular to the plane of the coupled panels and parallel to the plane of the coupled panels. Such coupling parts have to be produced with close tolerance. Therefore, a film on these coupling parts—or on a part thereof—must remain limited in thickness so that no problems arise during installation of the panels, wherein for example the film could be damaged or wherein coupling would be problematic.

In a preferred embodiment of the tenth aspect and/or eleventh aspect of the invention, the film formed by the film-forming polymer layer or the film-forming resin layer imparts vapour-tight properties and/or water-repellent properties to the respective edge(s).

In a preferred embodiment of the tenth aspect and/or eleventh aspect of the invention, the film-forming polymer layer or film-forming resin layer is applied by means of a water-based emulsion or a water-based dispersion.

In a preferred embodiment of the tenth aspect and/or eleventh aspect of the invention, the film-forming polymer layer or the film-forming resin layer comprises an alkyd—preferably a polyurethane-modified alkyd —, an acrylate, a polyurethane, a polysiloxane, a styrene acrylate, a urethane acrylate, an alkyd modified with fluorine or a styrene-butadiene copolymer, or the film-forming polymer layer or the film-forming resin layer is formed thereby. If an alkyd is used, this is preferably a polyurethane-modified alkyd and/or an alkyd of the "long oil alkyd" type. "Long oil alkyd" types have the advantage that they dry quickly.

In a preferred embodiment of the tenth aspect and/or eleventh aspect of the invention, the film-forming polymer layer or the film-forming resin layer comprises clay; for example, in the form of nanoclay and/or for example montmorillonite clay.

The addition of clay in the polymer film or the resin film provides an improved barrier action against moisture.

The twelfth aspect of the invention relates to a method for the manufacture of panels. Optionally this is a method according to any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect of the invention. The panels are rectangular, either square or oblong, wherein the panels comprise a substrate and a top layer, wherein the panels are provided with a first pair of opposite edges, namely a first edge and an opposite second edge, wherein the method comprises the steps:

applying a liquid on at least a part of the first edge and/or of the second edge, preferably wherein this liquid penetrates into the respective edge to a certain depth, drying the liquid on the first edge and/or the second edge by means of one or more HIR lamps (halogen infrared lamps).

This method provides very efficient drying of the liquid.

In a preferred embodiment of the twelfth aspect of the invention, during drying, a continuous gas stream—preferably a continuous air stream—flows over the surface of the panel to be dried, preferably wherein this gas stream is produced by means of a blowing device and/or a suction device.

Such embodiments have the advantage that risk of explosion or fire is prevented, since concentration of flammable or explosive evaporating solvent is avoided.

The thirteenth aspect of the invention relates to a method for the manufacture of panels. Optionally this method is a method according to any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect of the invention. The panels are rectangular, either square or oblong, wherein the panels comprise a substrate and a top layer. The panels are provided with a first pair of opposite edges, namely a first edge and an opposite second edge, wherein the method comprises the steps of applying a liquid on at least a part of the first edge and/or of the second edge. Preferably this liquid penetrates to a certain depth in the respective edge. The liquid comprises one or more of an acrylate, a methacrylate, a fluorinated acrylate, a fluorinated methacrylate, a fluorinated acrylate copolymer, an alkyd, an epoxy resin, a fluorinated epoxy resin, a styrene acrylate, a urethane acrylate, an alkyd modified with polyurethane, an alkyd modified with fluorine, a styrene butadiene copolymer or a polysiloxane.

When a fluorinated acrylate, or a fluorinated methacrylate, or a fluorinated acrylate copolymer is used, the fluorinated side chains preferably comprise four, five or six carbon atoms that comprise fluorine atoms and/or at least a proportion of the fluorinated side groups are based on perfluorobutane sulphonic acid. Such products have proved to be very efficient.

The combination with alkyd has proved advantageous for obtaining water repellence on the first edge of the panel. Preferably an alkyd is combined with a fluorinated acrylate.

The—at least partial—use of a fluorinated methacrylate has the advantage that the impregnating agent has better adhesion.

Preferably a polyurethane-modified alkyd and/or an alkyd of the "long oil alkyd" type is used. "Long oil alkyd" types have the advantage that they dry quickly.

In a preferred embodiment of the thirteenth aspect of the invention, the liquid comprises one or more of a fluorinated acrylate, a fluorinated methacrylate, or a fluorinated acrylate copolymer; preferably wherein this or these comprise(s) perfluorobutane sulphonic acid-based active side chains.

Such embodiments offer better water repellence for the edges on which this liquid is applied.

In a preferred embodiment of the thirteenth aspect of the invention, the liquid is water-based, or the liquid is solvent-based.

Solvent-based liquids have the advantage when used on panels wherein the substrate is wood-based (for example wherein the substrate is or comprises an MDF or HDF board) that on application of the liquid, the wood fibres will not stand up, as would be the case with a water-based liquid. Wood fibres that stand up are on the one hand disadvantageous for preventing water absorption; and on the other hand disadvantageous because this may lead to greater roughness on the edges of the panel. The greater roughness may disturb the close tolerances of coupling parts at the edges; this is disadvantageous for coupling the panels during installation of the panels in a covering, e.g. in a floor covering.

In a preferred embodiment of the thirteenth aspect of the invention, wherein the liquid is solvent-based, the solvent preferably comprises one or more of a glycol ether, propylene glycol methyl ether, propylene glycol methyl ether acetate, hydrocarbons—preferably aliphatic hydrocarbons and/or preferably iso-hydrocarbons —, butyl acetate, propyl acetate—for example 3-methoxy-3-methyl-1-butyl acetate (MMB-AC) or 1-methoxy-propyl acetate (MPA)-, a dibasic ester, a glycol diether, a benzoate ester, or a tetramethoxy ether.

The use of such solvents is preferred because good impregnation with the liquid is obtained.

Preferably the solvent comprises both a polar solvent and a non-polar solvent. More preferably the polar solvent comprises a butyl acetate and/or a propyl acetate.

Combinations of polar and non-polar solvents offer the best processability of the liquid, with respect to stability and application thereof.

Preferably the non-polar solvent is or comprises a hydrocarbon—more preferably an aliphatic hydrocarbon, even more preferably an aliphatic iso-hydrocarbon. Such solvents offer good solubility.

In a preferred embodiment of the thirteenth aspect of the invention, the polar solvent comprises one or more of an alcohol, a glycol ether, for example one or more of propylene glycol methyl ether, propylene glycol methyl ether acetate, butyl acetate, propyl acetate—for example 3-methoxy-3-methyl-1-butyl acetate (MMB-AC) or 1-methoxy-propyl acetate (MPA)-, a dibasic ester, a glycol diether, a benzoate ester, or a tetramethoxy ether.

In preferred embodiments of the thirteenth aspect of the invention the solvent comprises a glycol ether or a glycol diether, a hydrocarbon (preferably an aliphatic hydrocarbon, and more preferably an aliphatic iso-hydrocarbon) and a propyl acetate or a butyl acetate. The propyl acetate or the butyl acetate is added in order to increase the solubility of the active constituents (for example a combination of fluorinated acrylate copolymer and an alkyd) of the liquid. The purpose of the glycol ether or glycol diether is to prevent coagulation.

In a preferred embodiment of the thirteenth aspect of the invention, the liquid is solvent-based, wherein the solvent has a flash point above 30° ° C., preferably above 35° C., more preferably above 55° C.

Such embodiments increase safety when carrying out the method.

In a preferred embodiment of the thirteenth aspect of the invention, the liquid is solvent-based, wherein the solvents and optional additives in the liquid are exclusively of the aliphatic type, or the proportion of solvent and optional additive of the aromatic type in the liquid is less than 1000 ppm, or less than 100 ppm.

In a preferred embodiment of the thirteenth aspect of the invention, the percentage by weight of solid matter in the liquid is less than 15%, preferably less than 10%.

Such an embodiment ensures that the amount of solid matter applied can be controlled well, and good impregnation of the edges of the panel with this liquid can be obtained. Since only a small amount of solid matter has to be applied per unit specific surface area, the amount of solid matter to be applied can be controlled much better when there is a small amount of solid matter in the liquid.

In a preferred embodiment of the thirteenth aspect of the invention, the liquid comprises a liquid colourant. More preferably the liquid does not comprise any solid pigments.

If the liquid comprises a liquid colourant, it is possible to avoid lines becoming visible between the panels once the panels are installed. Colouring of the liquid can prevent this.

This embodiment can also ensure that when a lowered edge (for example a chamfer) is also treated with the liquid, this lowered edge is coloured, so that a visually more natural, nicer appearance is obtained.

In a preferred embodiment of the thirteenth aspect of the invention, the liquid comprises on the one hand an alkyd resin—preferably a urethane or isocyanate modified alkyd resin and/or a "long oil alkyd"—and on the other hand one or more of a fluorinated acrylate, a fluorinated methacrylate, a styrene acrylate, a urethane acrylate, a styrene butadiene copolymer or a fluorinated acrylate copolymer. "Long oil alkyd" types have the advantage that they dry quickly.

Such embodiments have the advantage that water repellence is obtained in two ways. More alkyd resin remains on the surface and provides a certain degree of film formation. There is greater penetration of the fluorinated acrylate, fluorinated methacrylate, styrene acrylate, urethane acrylate, styrene butadiene copolymer or fluorinated acrylate copolymer into the substrate of the panel and they provide water repellence through their fluorinated side chains.

Preferably, in the liquid the ratio of the solid matter of on the one hand the one or more of the fluorinated acrylate, fluorinated methacrylate, styrene acrylate, urethane acrylate, styrene butadiene copolymer or fluorinated acrylate copolymer; to on the other hand the alkyd resin is higher than 2, and preferably lower than 5, more preferably lower than 4, more preferably lower than 3.

Such embodiments give better properties with respect to preventing moisture absorption of installed panels.

In a preferred embodiment of the thirteenth aspect of the invention, the liquid imparts water-repellent properties to the edge on which this liquid is applied.

In a preferred embodiment of any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect and/or thirteenth aspect of the invention, the liquid penetrates to a certain depth, preferably more than 1 millimetre, into the respective edge. This depth of penetration is determined perpendicularly to the profile of the profiled edge on which the liquid is applied.

In a preferred embodiment of any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect and/or thirteenth aspect of the invention, the first edge comprises a sealing face substantially perpendicular to the upper surface of the panel; and the second edge comprises a sealing face substantially perpendicular to the upper surface of the panel, wherein the first edge of the panel can be coupled to the second edge of another such panel, wherein in the coupled state the scaling face of the first edge of the panel is in contact with or is close to the sealing face of the second edge of the other such panel; wherein during application of the liquid, the liquid on at least a part in the direction perpendicular to the upper surface—and preferably on the entire surface in the direction perpendicular to the upper surface of the panel—is applied on the sealing face of the first edge and on the sealing face of the second edge. Through contact of the sealing faces—or their close proximity—on which the liquid has been applied, even better water resistance of a covering with such panels is obtained.

In a preferred embodiment of any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect and/or thirteenth aspect of the invention, the panels comprise a second pair of opposite edges, namely a third edge and a fourth edge, wherein the third edge comprises a sealing face substantially perpendicular to the upper surface of the panel; wherein the fourth edge comprises a sealing face substantially perpendicular to the upper surface of the panel, wherein the third edge of the panel can be coupled to the third edge of another such panel, wherein in the coupled state the sealing face of the third edge of the panel is in contact with or is close to the sealing face of the fourth edge of the other such panel; wherein during application of the liquid, on at least a part in the direction perpendicular to the upper surface—and preferably on the entire surface in the direction perpendicular to the upper surface of the panel— the liquid is applied on the sealing face of the third edge and on the sealing face of the fourth edge. Through contact of the sealing faces—or their close proximity—on which the liquid has been applied, even better water resistance of a covering with such panels is obtained.

In a preferred embodiment of any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect and/or thirteenth aspect of the invention, the panels comprise a second pair of opposite edges, namely a third edge and a fourth edge, wherein one or more or all of the first edge, the second edge, the third edge and the fourth edge comprise a lowered edge, for example in the form of a chamfer, wherein, where liquid is applied on the edge(s), it is also applied on the lowered edge on this edge if said lowered edge is present.

Such an embodiment has the advantage that the lowered edge, for example formed by a chamfer, is also protected against water absorption.

In a preferred embodiment of any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect and/or thirteenth aspect of the invention, the panels comprise a second pair of opposite edges, namely a third edge and a fourth edge, wherein one or more or all of the first edge, the second edge, the third edge and the fourth edge comprise a lowered edge, for example in the form of a chamfer, wherein the method comprises the step of applying lacquer on the lowered edge, wherein if liquid is applied on the edge that comprises the lowered edge liquid, application of the lacquer may take place before or after application of the liquid on the respective edge.

This lacquer can provide a visually nice, lowered edge, for example in the form of a chamfer, while this lowered edge is also made waterproof.

Preferably application of the liquid and application of the lacquer on one or more of the first edge, second edge, third edge and/or fourth edge take place in the same continuous process.

In a preferred embodiment of any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect and/or thirteenth aspect of the invention, the substrate is selected from, or the substrate comprises: a wood fibre board, for example an MDF (Medium Density Fibreboard) or HDF (High Density Fibreboard) board, or a chipboard, or a mineral board, for example a magnesium oxide board, a plasterboard, a board made of mineral fibres bonded with a binder (for example by means of a thermosetting binder), or a fibre-cement board, or a polymer-based substrate, for example such as a filled or unfilled and/or foamed polyvinyl chloride-based substrate or a substrate based on some other thermoplastic or thermosetting polymer.

Although some of the stated substrates that can be used in the invention are waterproof per se, this does not necessarily apply to their edges. In the installed state of panels made from these substrates, moisture would be able to penetrate along the coupled edges of the panels. This moisture may possibly penetrate further into the substrate via porosity of the substrate, or cause problems under the panels. Therefore, it is also important with such substrates to ensure that no moisture can penetrate at the edges of installed panels.

In a preferred embodiment of any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect and/or thirteenth aspect of the invention, the panels comprise a decorative top layer. The decorative top layer may comprise a print, preferably wherein the decorative top layer is fastened directly or indirectly on an underlying substrate. The decorative top layer may comprise a wood veneer (thickness less than 2.5 mm) or a layer of wood (thickness starting from 2.5 mm), wherein an optional wood veneer preferably has a thickness between 0.4 and 0.8 mm.

In a preferred embodiment of any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect and/or thirteenth aspect of the invention, the panel is provided with a first pair of opposite edges, namely a first edge and an opposite second edge, wherein the panel comprises coupling parts on its first pair of opposite edges, so that the panel can be coupled on its first edge to the second edge of another such panel, wherein the coupling parts comprise locking elements so that in the coupled state, locking occurs in the direction perpendicular to the surface of the coupled panels and/or locking occurs in the plane of the coupled panels and perpendicular to the coupled edges. Preferably the coupling parts on the first pair of opposite edges are configured as overlapping, so that during coupling on the first pair of opposite edges, coupling with pretension is obtained.

In a preferred embodiment of any embodiment of the first aspect and/or second aspect and/or third aspect and/or fourth aspect and/or fifth aspect and/or sixth aspect and/or seventh aspect and/or eighth aspect and/or ninth aspect and/or tenth aspect and/or eleventh aspect and/or twelfth aspect and/or thirteenth aspect of the invention, the panels are floor panels.

The fourteenth aspect of the invention relates to a panel, wherein the panel is rectangular, either square or oblong, wherein the panel comprises a substrate and a top layer, wherein the panels are provided with a first pair of opposite edges, namely a first edge and an opposite second edge, wherein the panels comprise coupling parts on their first pair of opposite edges, so that the panel can be coupled on its first edge to the second edge of another such panel, wherein the surface of at least one of the first edge and the second edge—and preferably both of the first edge and of the second edge—of the panel comprises a film—preferably a polymer film or a film formed by a resin layer —, wherein the film has a thickness less than 50 micrometres, preferably less than 25 micrometres.

The coupling parts have to be produced with close tolerance. Therefore, a film on these coupling parts—or on a part thereof—must remain limited in thickness so that no problems arise during installation of the panels, wherein for example the film could be damaged.

In a preferred embodiment of the fourteenth aspect of the invention, the film imparts vapour-tight properties and/or water-repellent properties to the respective edge(s).

In a preferred embodiment of the fourteenth aspect of the invention, the polymer film or the film formed by a resin layer is applied by means of a water-based emulsion or a water-based dispersion.

In a preferred embodiment of the fourteenth aspect of the invention, the film comprises an alkyd—preferably a polyurethane-modified alkyd —, an acrylate, a polyurethane, a polysiloxane, a styrene acrylate, a urethane acrylate, an alkyd modified with fluorine or a styrene-butadiene copolymer or is formed therefrom. Such embodiments ensure good film formation on the respective edges.

In a preferred embodiment of the fourteenth aspect of the invention, the film comprises clay, for example in the form of nanoclay and/or preferably montmorillonite clay.

The addition of clay in the polymer film or the resin film provides an improved barrier action against moisture.

The fifteenth aspect of the invention relates to a panel, wherein the panel is rectangular, either square or oblong, wherein the panel comprises a substrate and a top layer, wherein the panel is provided with a first pair of opposite edges, namely a first edge and an opposite second edge, wherein the panel comprises coupling parts on its first pair of opposite edges, so that the panel can be coupled on its first edge to the second edge of another such panel, preferably wherein the coupling parts comprise locking elements so that in the coupled state, locking occurs in the direction perpendicular to the surface of the coupled panels and/or locking occurs in the plane of the coupled panels and perpendicular to the coupled edges. Preferably the coupling parts on the first pair of opposite edges are configured as overlapping, so that during coupling on the first pair of opposite edges, coupling with pretension is obtained. The panel is provided with a second pair of opposite edges, namely a third edge and an opposite fourth edge, wherein the panels comprise coupling parts on their second pair of opposite edges so that the panel can be coupled on its third edge to the fourth edge of another such panel, preferably wherein the coupling parts comprise locking elements so that in the coupled state, locking occurs in the direction perpendicular to the surface of the coupled panels and/or locking occurs in the plane of the coupled panels and perpendicular to the coupled edges. Preferably the coupling parts are configured as overlapping on the second pair of opposite edges, so that during coupling on the second pair of opposite edges, coupling with pretension is obtained. Each of the first edge, the second edge, the third edge and the fourth edge comprises a sealing face, substantially perpendicular to the upper surface of the panel, wherein in the coupled state of the panel with its first edge coupled to the second edge of another such panel, the sealing face of the first edge of the panel is in contact with or is close to the sealing face of the second edge of the other such panel; wherein in the coupled state of the panel with its third edge against the fourth edge of another such panel, the sealing face of the third edge of the panel is in contact with or is close to the sealing face of the fourth edge of the other such panel; wherein the sealing faces of the third edge and of the fourth edge from each of the four corner points of the panel towards the middle of respectively the third edge and the fourth edge, at least over a certain distance from the respective corner point, are provided with an impregnating agent and/or a coating; wherein the average concentration of the impregnating agent and/or coating over this defined distance is higher than the average of the concentration of impregnating agent and/or coating on the sealing faces in the middle of the first edge and the second edge.

Since the corner points of the panels in an installed covering with the panels are the most critical zones for penetration of moisture, this embodiment is advantageous because extra protection against moisture penetration is offered at corner points.

Coupling of the panels with pretension is advantageous because the sealing faces of coupled edges are pressed against each other by the pretension. This reduces the risk of moisture penetration between coupled panels.

Preferably the panel is elongated and the first pair of opposite edges form the long edges of the panel.

In a preferred embodiment of the fifteenth aspect of the invention, the sealing faces of the first edge and the second edge from each of the four corner points of the panel towards the middle of respectively the first edge and the second edge at least over a certain distance from the respective corner point, are provided with the impregnating agent and/or the coating; wherein the average concentration of the impregnating agent and/or coating over this defined distance is higher than the average of the concentration of impregnating agent and/or coating on the sealing faces in the middle of the first edge and the second edge.

In a preferred embodiment of the fifteenth aspect of the invention, the sealing faces of the first edge and second edge over a certain length in the middle of the respective edge are not provided with impregnating agent or coating. This embodiment is advantageous because less impregnating agent or coating is required, while good results are nevertheless achieved since the corner points—which are the most critical zones for moisture penetration on installed panels—are protected against water penetration.

In a preferred embodiment of the fifteenth aspect of the invention, the sealing faces of the third edge and of the fourth edge are provided with the impregnating agent and/or the coating over the full length of the respective edge. This embodiment offers extra protection against moisture penetration at the edge of installed panels.

In a preferred embodiment of the fifteenth aspect of the invention, the sealing faces of the third edge and of the fourth edge are not provided with the impregnating agent and/or the coating over the full length of the respective edge, preferably wherein the sealing faces of the third edge and fourth edge are not provided with the impregnating agent and/or the coating over a certain length in the middle of their length. This embodiment is advantageous because less impregnating agent or coating is required, while good results are nevertheless achieved since the corner points—which are the most critical zones for moisture penetration on installed panels—are protected against water penetration.

In a preferred embodiment of the fifteenth aspect of the invention, one, several or all of the first edge, the second edge, the third edge and the fourth edge are provided with a lowered edge region, for example in the form of a chamfer. Preferably the lowered edge region(s) is/are provided with lacquer, more preferably wherein the lacquer is or comprises an acrylate lacquer, a polyurethane lacquer or an alkyd and/or wherein the lacquer comprises pigment or colourant.

Such embodiments are advantageous because any swelling of a lowered edge region (for example of a chamfer) caused by moisture absorption is visually not or almost not visible. Lacquer on the lowered edge region provides a visually nice effect.

The sixteenth aspect of the invention relates to a panel, optionally a panel such as in any embodiment of the fifteenth aspect of the invention, wherein the panel is rectangular, either square or oblong, wherein the panel comprises a substrate and a top layer, wherein the panel is provided with a first pair of opposite edges, namely a first edge and an opposite second edge, wherein the panel comprises coupling parts on its first pair of opposite edges, so that the panel can be coupled on its first edge to the second edge of another such panel, wherein the first edge is provided with a lowered edge region, preferably in the form of a chamfer, wherein the first edge comprises an impregnating agent, on at least a part of—and preferably on the entire—lowered edge region and on at least part of the first edge below and directly adjacent to the lowered edge region, wherein the impregnating agent provides a water-repellent effect where it has been applied on the first edge; and at the same time provides a surface layer on and colouring of the surface of the lowered edge region.

The sixteenth aspect of the invention offers the advantage that one and the same impregnation ensures that no water can penetrate into the edge of the panel once panels are installed and that also the lowered edges are protected against water penetration and at the same time the lowered edges are coloured, so that visually they provide a nice effect. This is especially important if these lowered edges are produced in the substrate.

In a preferred embodiment of the sixteenth aspect of the invention, each of the first edge and second edge comprises a sealing face substantially perpendicular to the surface of the panel; wherein in the coupled state of the panel with its first edge coupled to the second edge of another such panel, the sealing face of the first edge of the panel is in contact with or is close to the sealing face of the second edge of the other such panel; wherein the sealing face of the first edge comprises impregnating agent at least over its upper part—and preferably over its entire surface.

In such embodiments there is even better prevention of moisture penetrating between the coupled panels and via the edges of the coupled panels into the substrate of the panels.

Preferably the sealing face of the first edge is immediately adjacent to the lowered edge region of the first edge. Therefore, there is even better prevention of moisture penetration between and into coupled panels.

The seventeenth aspect of the invention relates to a panel, optionally a panel such as in any embodiment of the fourteenth aspect and/or fifteenth aspect and/or sixteenth aspect of the invention, wherein the panel is rectangular, either square or oblong, wherein the panel comprises a substrate and a top layer, wherein the panel is provided with a first pair of opposite edges, namely a first edge and an opposite second edge, wherein the panel comprises coupling parts on its first pair of opposite edges, so that the panel can be coupled on its first edge to the second edge of another such panel, wherein the first edge comprises an impregnating agent.

Preferably the impregnating agent comprises one or more of a fluorinated acrylate, a fluorinated methacrylate, or a fluorinated acrylate copolymer; preferably wherein this or these comprise(s) perfluorobutane sulphonic acid-based active side chains.

When a fluorinated acrylate, a fluorinated methacrylate, or a fluorinated acrylate copolymer is used, the fluorinated side chains preferably comprise four, five or six carbon atoms that comprise fluorine atoms and/or at least a proportion of the fluorinated side groups are based on perfluorobutane sulphonic acid. Such products have proved to be very efficient.

The—at least partial—use of a fluorinated methacrylate—for example in a fluorinated acrylate copolymer—has the advantage that the impregnating agent has better adhesion.

Preferably the impregnating agent comprises a colourant. If the impregnating agent comprises a colourant, it is possible to avoid lines becoming visible between the panels once the panels are installed. Colouring of the impregnating agent can prevent this.

This embodiment can also ensure that when a lowered edge (for example a chamfer) has also been treated with impregnating agent, this lowered edge is coloured, so that a visually more natural, nicer appearance is obtained.

In a preferred embodiment of the seventeenth aspect of the invention the impregnating agent comprises on the one hand an alkyd resin—preferably a urethane or isocyanate modified alkyd resin, and/or preferably a "long oil alkyd"—and on the other hand one or more of a fluorinated acrylate, a fluorinated methacrylate, a fluorinated acrylate copolymer, a styrene acrylate, a urethane acrylate, or a styrene butadiene copolymer.

Such embodiments have the advantage that water repellence at the edges of the panel is obtained in two ways. The alkyd resin remains more on the surface and provides a certain degree of film formation. The fluorinated acrylate, fluorinated methacrylate, fluorinated acrylate copolymer, styrene acrylate, urethane acrylate, or styrene butadiene copolymer penetrates more into the substrate of the panel and provides water repellence owing to its fluorinated side chains.

The use of a fluorinated methacrylate has the advantage that the impregnating agent has better adhesion.

Preferably, in the impregnating agent the ratio of on the one hand the solid matter of the one or more of a fluorinated acrylate, a fluorinated methacrylate, a fluorinated acrylate copolymer, a styrene acrylate, a urethane acrylate, or a styrene butadiene copolymer to on the other hand the solid matter of the alkyd resin is higher than 2, and preferably lower than 5, more preferably lower than 4, more preferably lower than 3.

Such embodiments give better properties with respect to preventing moisture absorption of the panels.

Preferably the impregnating agent has penetrated into the substrate to a certain extent, wherein there is a gradient of the weight ratio of alkyd resin relative to the total of alkyd resin and the one or more of a fluorinated acrylate, a fluorinated methacrylate, a fluorinated acrylate copolymer, a styrene acrylate, a urethane acrylate, or a styrene butadiene copolymer over the impregnation depth, wherein the weight ratio of alkyd is higher on the surface of the substrate.

Preferably the alkyd resin is located mainly on or near the surface of the zone where the impregnating agent is applied.

In a preferred embodiment of the seventeenth aspect of the invention, the impregnating agent imparts water-repellent properties to the edge on which this impregnating agent is applied.

In a preferred embodiment of the fourteenth aspect and/or fifteenth aspect and/or sixteenth aspect and/or seventeenth aspect of the invention, the panel is elongated, wherein the first pair of opposite edges form the long edges of the panel.

In a preferred embodiment of the fourteenth aspect and/or fifteenth aspect and/or sixteenth aspect and/or seventeenth aspect of the invention, the panel comprises coupling parts on its first pair of opposite edges, so that the panel can be coupled on its first edge to the second edge of another such panel, preferably wherein the coupling parts comprise locking elements so that in the coupled state, locking occurs in the direction perpendicular to the surface of the coupled panels and/or locking occurs in the plane of the coupled panels and perpendicular to the coupled edges. Preferably the coupling parts on the first pair of opposite edges are configured as overlapping, so that during coupling on the first pair of opposite edges, coupling with pretension is obtained. The panel is provided with a second pair of opposite edges, namely a third edge and an opposite fourth edge, wherein the panels comprise coupling parts on their second pair of opposite edges so that the panel can be coupled on its third edge to the fourth edge of another such panel. Preferably the coupling parts comprise locking elements so that in the coupled state, locking occurs in the direction perpendicular to the surface of the coupled panels and/or locking occurs in the plane of the coupled panels and perpendicular to the coupled edges. Preferably the coupling parts are configured as overlapping on the second pair of opposite edges, so that during coupling on the second pair of opposite edges, coupling with pretension is obtained.

Preferably each of the first edge, the second edge, the third edge and the fourth edge comprises a sealing face, substantially perpendicular to the upper surface of the panel, wherein in the coupled state of the panel with its first edge coupled to the second edge of another such panel, the sealing face of the first edge of the panel is in contact with or is close to the sealing face of the second edge of the other such panel; wherein in the coupled state of the panel with its third edge against the fourth edge of another such panel, the sealing face of the third edge of the panel is in contact with or is close to the sealing face of the fourth edge of the other such panel.

In a preferred embodiment of the fourteenth aspect and/or fifteenth aspect and/or sixteenth aspect and/or seventeenth aspect of the invention, the coupling parts of the first pair of opposite edges are produced substantially in the form of a tongue and a groove, which in the coupled state provide locking in the direction perpendicular to the plane of the coupled panels, wherein the tongue and the groove are provided with locking elements, which in the coupled state of two such panels on their first pair of opposite edges provide locking in the direction in the plane of the panels and perpendicular to the coupled edges, wherein the groove is delimited by an upper lip and a lower lip, preferably wherein the lower lip projects farther in the distal direction than the upper lip, wherein the lower lip comprises a locking element in the form of an upwards directed locking element for interacting with a locking element on the underside of the tongue for forming locking in the direction in the plane of the panels and perpendicular to the coupled edges.

In a preferred embodiment of the fourteenth aspect and/or fifteenth aspect and/or sixteenth aspect and/or seventeenth aspect of the invention, the panel may be coupled on its first edge to the second edge of another such panel by means of a turning motion and/or by pushing the panels together with a snap effect substantially parallel to the plane of the panels.

In a preferred embodiment of the fourteenth aspect and/or fifteenth aspect and/or sixteenth aspect and/or seventeenth aspect of the invention, the second pair of opposite edges comprises coupling parts that allow the panel to be coupled to another such panel by means of a downward motion of the panel relative to the other such panel; wherein the coupling parts of the second pair of opposite edges, in the coupled state of two such panels, form a first locking system on their second pair of opposite edges that provides locking in the plane of the coupled panels and perpendicular to the coupled edges; and form a second locking system in the direction perpendicular to the coupled panels; wherein the first locking system is formed at least by an upwards directed bottommost hook-shaped portion that is located on one of the aforementioned second pair of opposite edges, as well as a downwards directed upper hook-shaped portion that is located on the other, opposite edge of the aforementioned second pair of opposite edges, and these hook-shaped portions can be hooked in behind each other by means of the aforementioned downward motion; wherein the lower hook-shaped portion consists of a lip with an upwards directed locking element, whereas the upper hook-shaped portion consists of a lip with a downwards directed locking element; wherein the second locking system possesses locking elements in the form of locking surfaces.

The second locking system may comprise an insert, for providing partial or complete locking in the direction perpendicular to the plane of the coupled panels.

The second locking system may be made entirely of material of the substrate.

In a preferred embodiment of the fourteenth aspect and/or fifteenth aspect and/or sixteenth aspect and/or seventeenth aspect of the invention, a plurality of such panels may be installed by the fold-down method, wherein a covering, for example a floor covering is formed.

In a preferred embodiment of the fourteenth aspect and/or fifteenth aspect and/or sixteenth aspect and/or seventeenth aspect of the invention, the coupling parts of the second pair of opposite edges are produced substantially in the form of a tongue and a groove, which in the coupled state provide locking in the direction perpendicular to the plane of the coupled panels, wherein the tongue and the groove are provided with locking elements which in the coupled state of two such panels on their second pair of opposite edges provide locking in the direction in the plane of the panels and perpendicular to the coupled edges, wherein the groove is delimited by an upper lip and a lower lip, preferably wherein the lower lip projects farther in the distal direction than the upper lip, wherein the lower lip comprises a locking element in the form of an upwards directed locking element for interacting with a locking element on the underside of the tongue for forming locking in the direction in the plane of the panels and perpendicular to the coupled edges. More preferably, the coupling parts are configured as overlapping on the second pair of opposite edges, so that during coupling on the second pair of opposite edges, coupling with pretension is obtained.

In a preferred embodiment of the fourteenth aspect and/or fifteenth aspect and/or sixteenth aspect and/or seventeenth aspect of the invention, one, several or all of the first edge, the second edge, the third edge and the fourth edge are provided with a lowered edge region, for example in the form of a chamfer, preferably wherein the lowered edge region(s) is/are provided with lacquer, more preferably wherein the lacquer is or comprises an acrylate lacquer, a polyurethane lacquer or an alkyd and/or wherein the lacquer comprises pigment or colourant.

In a preferred embodiment of the fourteenth aspect and/or fifteenth aspect and/or sixteenth aspect and/or seventeenth aspect of the invention, each of the first edge and second edge comprises a sealing face substantially perpendicular to the surface of the panel; wherein in the coupled state of the panel with its first edge coupled to the second edge of another such panel, the sealing face of the first edge of the panel is in contact with or is close to the sealing face of the second edge of the other such panel; wherein the sealing face of the first edge comprises impregnating agent at least over its upper part—and preferably over its entire surface.

Preferably the sealing face of the first edge is immediately adjacent to the lowered edge region of the first edge.

In a preferred embodiment of the fourteenth aspect and/or fifteenth aspect and/or sixteenth aspect and/or seventeenth aspect of the invention, the impregnating agent penetrates to a certain depth into the edge where the impregnating agent was applied, preferably wherein this depth is at least 1 millimetre. This depth of penetration is determined perpendicularly to the profile of the profiled edge on which the liquid is applied.

In a preferred embodiment of the fourteenth aspect and/or fifteenth aspect and/or sixteenth aspect and/or seventeenth aspect of the invention, the substrate is selected from or the substrate comprises:

- a wood fibre board, for example an MDF (Medium Density Fibreboard) or HDF (High Density Fibreboard) board, or
- a chipboard, or
- a mineral board, for example a magnesium oxide board, a plasterboard, a board made of mineral fibres bonded with a binder (for example by means of a thermosetting binder), or a fibre-cement board, or a polymer-based substrate, for example such as a filled or unfilled and/or foamed polyvinyl chloride-based substrate or a substrate based on some other thermoplastic or thermosetting polymer.

In a preferred embodiment of the fourteenth aspect and/or fifteenth aspect and/or sixteenth aspect and/or seventeenth aspect of the invention, the panel comprises a decorative top layer, wherein the decorative top layer comprises a print, preferably wherein the decorative top layer is fastened directly or indirectly on an underlying substrate, or wherein the decorative top layer comprises a wood veneer (thickness <2.5 mm) or a layer of wood (thickness starting from 2.5 mm), wherein an optional wood veneer preferably has a thickness from 0.4 to 0.8 mm.

Preferably the panel is a floor panel.

According to each of the various aspects, several—and preferably all—edges of the panels may be treated or may have been treated in a comparable or identical manner.

If in any aspect of the invention use is made of a styrene acrylate, this is preferably a styrene acrylate dispersion with particle size less than 0.15 micrometre, more preferably with particle size less than 0.10 micrometre, more preferably with particle size less than 0.07 micrometre.

The use of a styrene butadiene copolymer (alone or in combination with other active substances) or of an alkyd modified with polyurethane (alone or in combination with other active substances) or of a styrene acrylate (alone or in combination with other active substances) has proved particularly advantageous for making the edges of panels with a magnesium oxide substrate resistant to water and resistant to water vapour.

It also falls within the invention to combine the various aspects—and embodiments thereof—provided they are not incompatible with each other.

In various embodiments of various aspects of the invention, opposite edges of the panels comprise sealing faces. It is stated that in the coupled state the sealing faces come into contact with each other or are located close to each other. The sealing faces are preferably intended to come into contact with each other, however—for example through shrinkage of the coupled panels—a small opening may arise between the sealing faces of the coupled panels. In that case, however, the sealing faces are still always close to each other.

BRIEF DESCRIPTION OF THE DRAWINGS

For better illustration of the features of the invention, some preferred embodiments are described hereunder, as examples without any limiting character, referring to the appended drawings, in which.

DETAILED DESCRIPTION OF VARIOUS EMBODIMENTS

Figure 1:
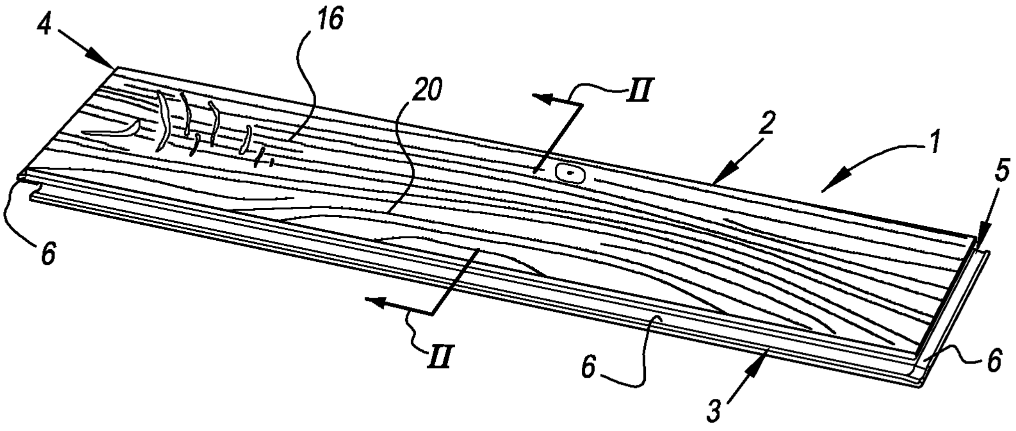
FIG. 1 shows a floor panel obtained on the basis of the methods of the invention.

FIG. 1 shows an elongated rectangular floor panel 1 that is provided with coupling parts 6 on two pairs of opposite edges, 2-3 (the long edges) and 4-5 (the short edges). The coupling parts allow the panel to be coupled on its first long edge 2 to the second long edge 3 of another such panel; and allow the panel to be coupled on its first short edge 4 to the second short edge 5 of another such panel.

Figure 2:
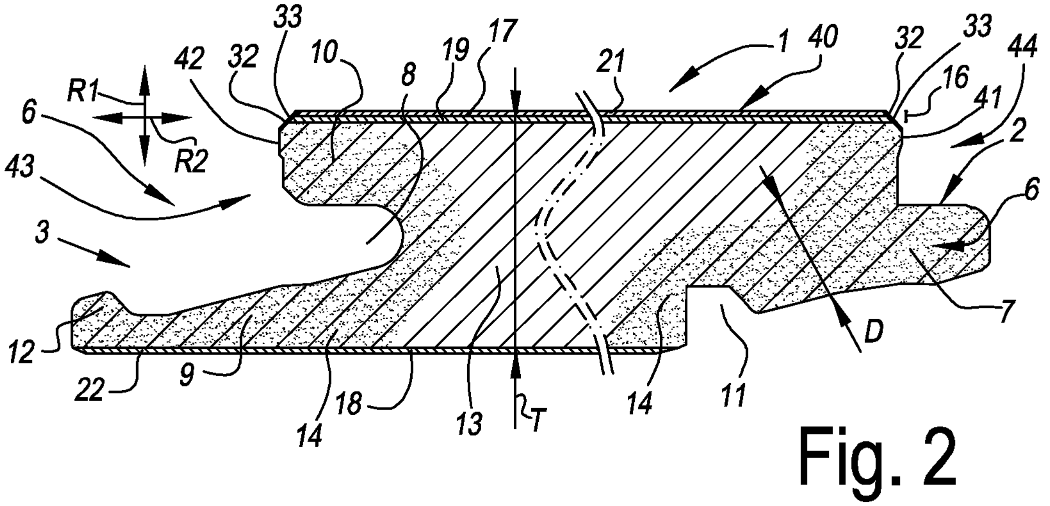
FIG. 2 shows this floor panel in a cross-section along line II-II in FIG. 1.

FIG. 2, which shows the floor panel from FIG. 1 in a cross-section along line II-II in FIG. 1, illustrates that the coupling parts 6 form a first locking system on the long edges 2-3, which provides locking in the plane of the panels and perpendicular to the long edges 2-3, namely locking in the horizontal direction R2; and a second locking system that produces locking perpendicular to the plane of the panels, namely locking in the vertical direction R1. The coupling parts 6 illustrated in this example are mainly formed by a tongue 7 and a groove 8, which provide the locking in the vertical direction R1. The tongue 7 comprises, on one of the two groove lips 9-10, in this case only on the lower groove lip 9, an additional locking element 12; which together with an additional locking element 11 on the underside of the tongue 7 provides, in the coupled state, the locking in the horizontal direction R2.

The coupling parts 6 are of the type that allows two such panels 1 to be coupled together selectively by means of a turning motion or by means of a horizontal sliding movement of one such panel relative to another such panel. In the example, the coupling parts are produced entirely in the substrate 13. This substrate may an MDF (Medium Density Fibreboard) or an HDF (High Density Fibreboard) board. Other materials for the substrate are however also possible in the context of the invention, for example mineral boards (for example magnesium oxide boards, plasterboards, boards made from mineral fibres bonded with a binder, fibre-cement boards etc.), or polymer-based substrates, for example such as filled or unfilled polyvinyl chloride-based substrates or substrates based on other thermoplastic or thermosetting polymers.

Preferably the coupling parts 6 on the first pair of opposite edges 2, 3 are configured as overlapping, so that during coupling on the first pair of opposite edges, coupling with pretension is obtained. As a result, in the coupled state, the edges of the coupled panels are pushed together. This can be obtained because in the coupled state the lower lip 9 is slightly bent elastically. This elastic bending gives rise to a compressive force that presses the coupled edges against each other.

The panel 1 further comprises a top layer 40. This top layer 40 comprises a decorative layer 16 that comprises a print 17. On the underside of the panel, a balance layer 18 is applied on the substrate 13. The print 17 may be applied on a sheet of paper 19. The print may represent a wood pattern 20. The top layer 40 further comprises a wearing layer 21 above the print 17. In the example the wearing layer comprises a sheet of paper impregnated with a thermosetting resin (preferably a melamine-formaldehyde resin); and optionally hard particles such as aluminium oxide.

The balance layer 18 also comprises a sheet of paper 22 impregnated with a thermosetting resin (preferably a melamine-formaldehyde resin).

FIG. 2 illustrates that both edges of the first pair of opposite edges 2-3 have been treated with a liquid, in the form of an impregnating agent 14. During application of this agent, it has penetrated to a depth D in these edges of the panel 1. This penetration D, measured perpendicularly to the coupling parts 6, is for example more than 0.8 millimetre; or even more than 10 percent of the thickness T of the panel 1.

Both long edges 2-3 comprise a lateral edge 43, 44 and a chamfer 32. These chamfers 32 were obtained by a milling operation. A lacquer 33 is applied on both chamfers, and provides colouring of these chamfers 32.

The lateral edges 43, 44 of both edges 2-3 of the first pair of opposite edges each comprise a sealing face 41, 42. These sealing faces 41, 42 are substantially perpendicular to the surface of the panel. In the coupled state of two panels, on their first pair of opposite edges 2-3, the sealing faces 41, 42 come into contact with each other. In the example shown, impregnating agent 14 is applied via the liquid on the entire surface of both sealing faces 41, 42; in order to obtain good water repellence of the coupled panels.

The floor panel 1 from FIG. 1 may be provided with coupling parts 6 on the pair of opposite short edges such as on the long edges, or with other coupling parts. Preferably the pair of opposite short edges is provided with coupling parts that comprise locking elements so that in the coupled state, locking occurs in the direction perpendicular to the surface of the coupled panels and locking also occurs in the plane of the coupled panels and perpendicular to the coupled edges. The coupling parts may be configured on the second pair of opposite edges so that coupling with pretension is obtained. Preferably, an impregnating agent is also applied on the second pair of opposite edges, by applying liquid; and each of the pair of opposite short edges comprises a chamfer that is provided with lacquer. The method according to the invention may be employed on the first pair of opposite edges but also on the second pair of opposite edges.

Figure 3:
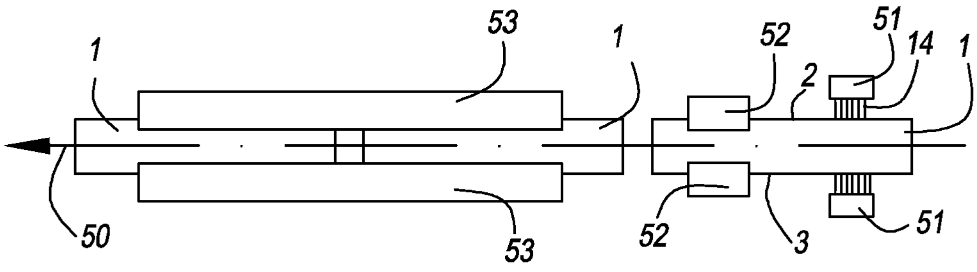
FIG. 3 illustrates schematically the method according to the first aspect of the invention for application of the liquid and the lacquer.

FIG. 3 illustrates schematically an embodiment of the method according to the first aspect of the invention for application of the liquid and the lacquer; and the successive drying of the lacquer and the liquid. Panels 1 are led by a continuous process in the direction indicated with reference 50. On the panels, liquid 14 is applied on the two edges 2, 3 of the first pair of opposite edges by means of a spraying system 51. The example shows application of the liquid by means of a spraying system, but other systems for application of the liquid are also possible. Then, while the liquid is still wet on the first pair of opposite edges of the panel, lacquer is applied on the chamfers of both edges of the first pair of opposite edges by means of applicators 52. Then the panels 1 continue in the continuous process and the panels are led through drying installations 53, which dry the lacquer and the liquid. These drying installations 53 may for example comprise a plurality of HIR lamps (halogen infrared lamps) in combination with a continuous air stream over the edges. This air stream may for example be produced by a combination of blowing systems and suction systems.

Figure 4:
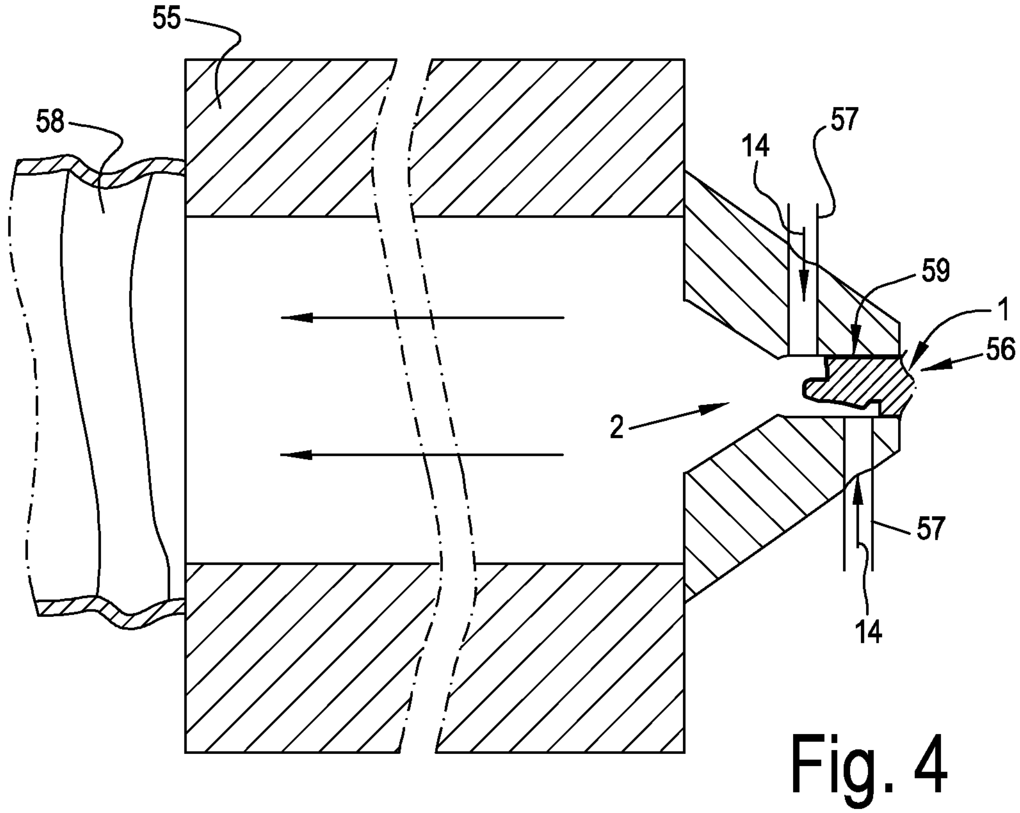
FIG. 4 illustrates a method for application of the liquid by means of a vacuum technique.

FIG. 4 illustrates a method for application of the liquid by means of a vacuum technique. This method can be used in the invention. It relates to so-called "Schielekoppen", which for example are of the type that is known per se from DE9202976U1. These spray heads 55 are usually employed for continuous application of substances on the edges of panels. For this purpose, these spray heads 55 have a so-called passing gap 56 which abuts closely, almost without clearance, with the edge 2 to be treated. The substance 14 to be applied is supplied via flexible lines 57 in the immediate vicinity of the respective edge 2 and any excess substance is extracted straight back via a suction line 58, so that the risk of the substance contaminating the decorative surface 59 of the floor panel 1 is minimal. Through connection with flexible lines 57, this spray head 55 is easy to install or position relative to the edge 2 to be treated of the floor panel 1. It is to be noted that it is not excluded that floor panel 1 with its decorative surface 59 directed downwards is led through the passing gap 56 of said spray head 55.

Figure 5:
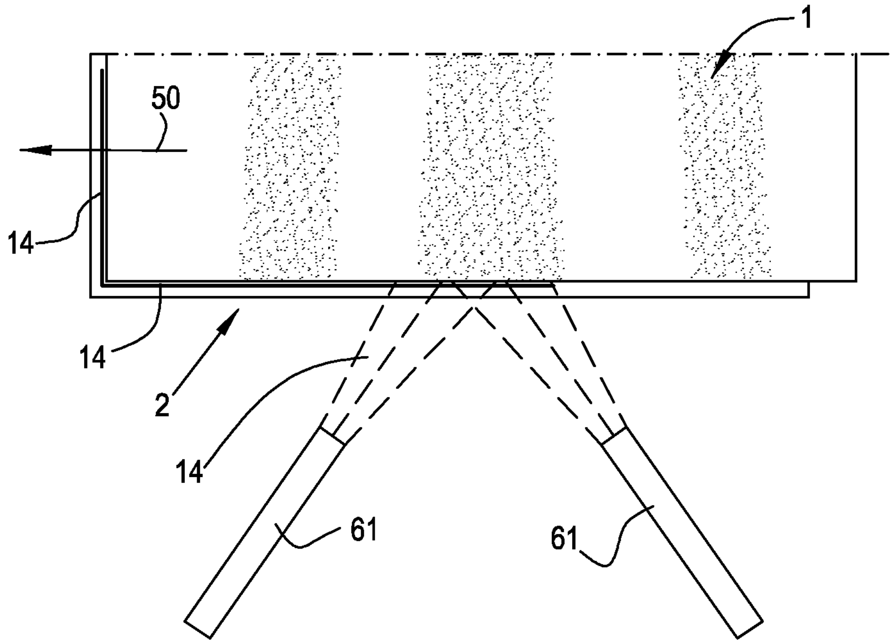
FIG. 5 illustrates a method for spraying the liquid on the edge of a panel.

FIG. 5 illustrates schematically an example of a method for spraying the liquid on the edge of a panel, such as may be used in the invention. The panels 1 pass through the process continuously in the direction indicated by reference number 50. By means of two spray heads 61, which are at an angle relative to the edge 2 that is to be sprayed with liquid, liquid 14 is sprayed on the edge 2. The two spray heads 61 are set up in different directions. By adjusting the arrangement of the spray heads, the whole edge of the panel—viewed in the direction perpendicular to the plane of the panel—can be sprayed with liquid, or a specific desired part of this edge.

FIG. 5 also illustrates the fourth aspect of the invention. The spray heads 61 are seen in the projection on the plane of the panel at an angle adjusted relative to the plane of the panel, wherein this angle is less than 90°. The two spray heads 61 are set up so that a first spray head is active in a direction with a component that is opposite to the direction of feed 50 of the panel 1; and a second spray head is active in a direction with a component parallel to the direction of feed 50 of the panel 1.

The spray heads 61 in the example in FIG. 5 have been set up and are controlled so that these two spray heads apply liquid at least partly on the same surface of the panel 1.

The two spray heads have been set up and are controlled so that they also apply liquid 14 on an adjacent edge of the edge on which the spray head applies liquid.

Figure 6:
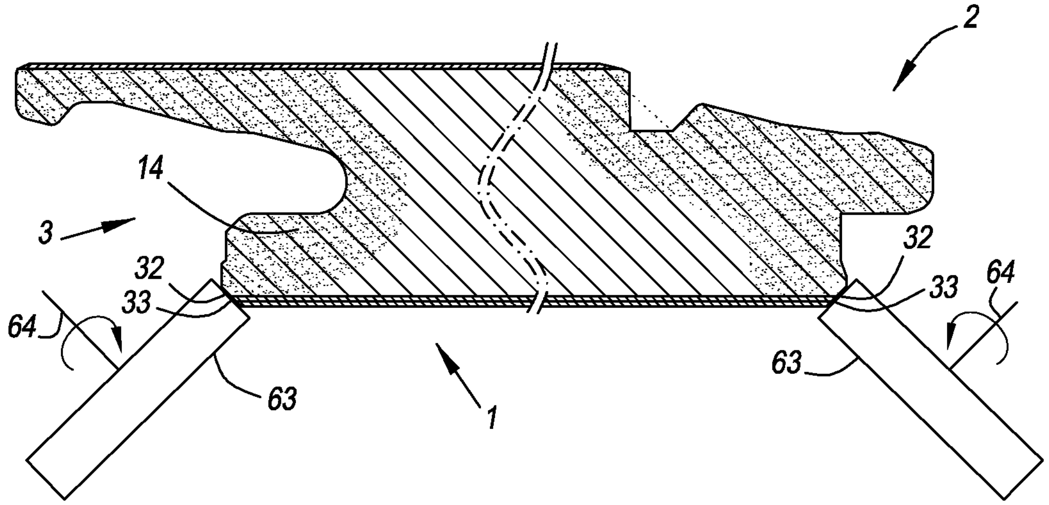
FIG. 6 illustrates how the lacquer can be applied on a chamfer on the edge of a panel by means of a transfer roller.

FIG. 6 illustrates how, in embodiments of the invention, the lacquer can be applied on the chamfers 32 on the edges 2, 3 of a panel 1 by means of a transfer roller 63, wet on wet after application of the liquid 14. This can—as is also shown in FIG. 3, take place simultaneously on two opposite edges 2, 3. The transfer rollers 63 rotate about their axis 64 and apply the lacquer 33 on the chamfers 32. There are various ways of applying the lacquer on the transfer roller; these are not illustrated in FIG. 6. The transfer roller may for example pick up lacquer by rotating in a bath containing the lacquer.

Figure 7:
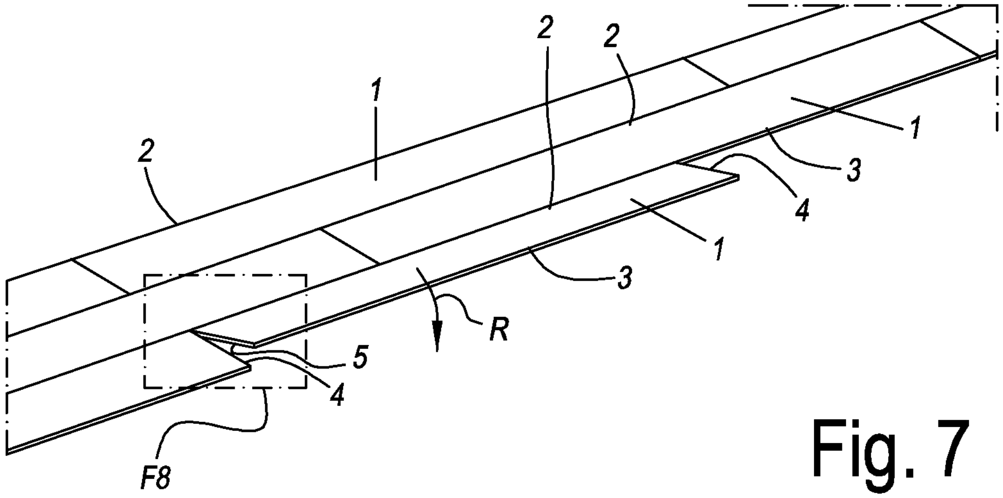
FIG. 7 shows schematically a part of a floor covering that can be laid with panels according to aspects of the invention, or with panels made according to aspects of the invention.
Figure 8:
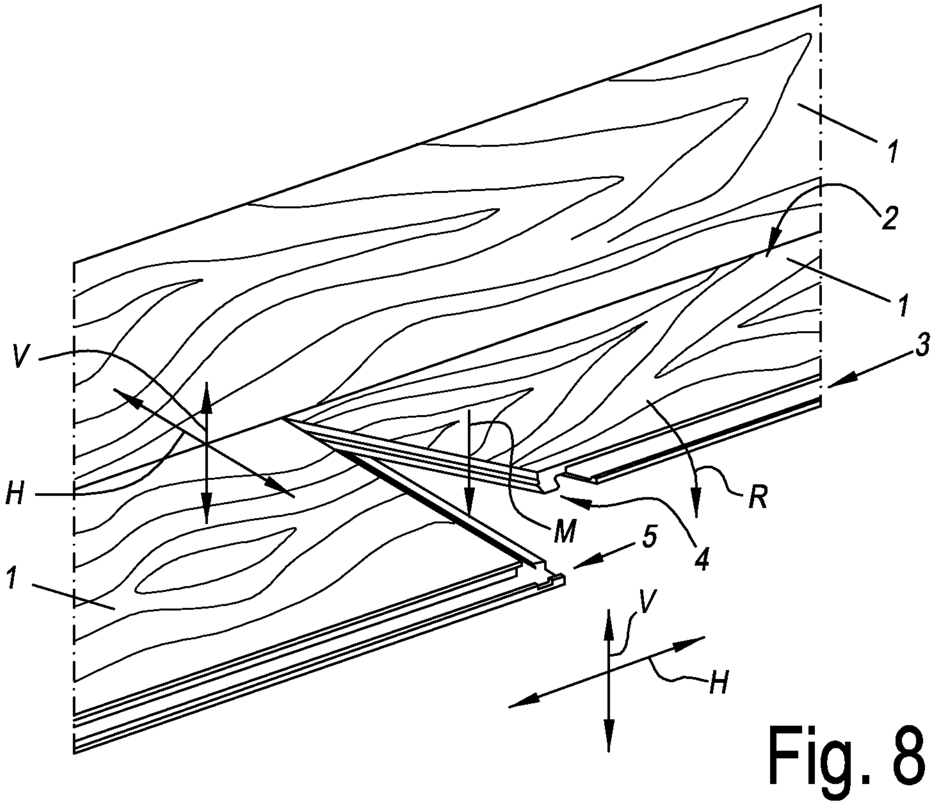
FIG. 8 shows, on a larger scale, the part indicated with F8 in FIG. 7.

FIG. 7 shows schematically a part of a floor covering that can be laid with examples of panels according to aspects of the invention, or with panels made according to aspects of the invention. FIG. 8 shows, on a larger scale, the part indicated with F8 in FIG. 7.

The panels 1 from the example in FIGS. 7 and 8 are rectangular and elongated. The panels comprise a first pair of opposite edges 2, 3, namely a first edge 2 and an opposite second edge 3. The panels comprise coupling parts on their first pair of opposite edges, so that the panel can be coupled on its first edge to the second edge of another such panel, by means of a turning motion R.

The panels 1 in this example are provided with a second pair of opposite edges 4, 5, namely a third edge 4 and an opposite fourth edge 5, wherein the panels comprise coupling parts on their second pair of opposite edges so that the panel can be coupled on its third edge 4 to the fourth edge 5 of another such panel by means of a downward motion M.

Examples of panels according to the invention—and/or which can be made according to the various aspects of the invention, may—for example as shown in FIGS. 7 and 8 be installed by the fold-down technique, wherein panels on the first pair of opposite edges are coupled by means of a turning motion R, wherein at the same time panels are coupled on their second pair of opposite edges by means of a downward motion M.

FIG. 1 illustrates a panel that can be used in coverings as shown in FIGS. 7 and 8. FIG. 2 shows an example of a first pair of opposite edges 2, 3 that can be used with panels as in the example shown in FIGS. 7 and 8.

Figure 9:
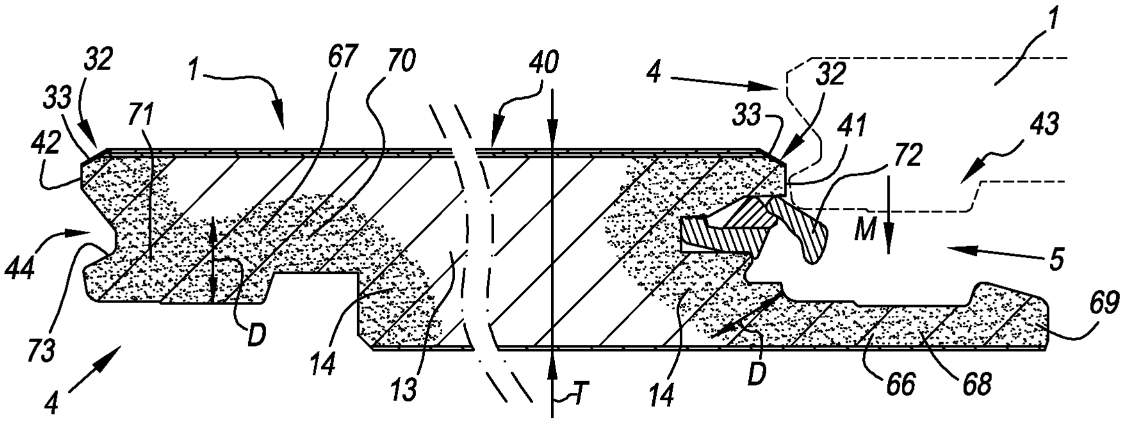
FIGS. 9 and 10 show examples of the second pair of opposite edges of a panel that may be used in the example of the floor covering in FIGS. 7 and 8.

FIG. 9 shows an example of the second pair of opposite edges 4, 5 of a panel 1 that can be used in the example of the floor covering in FIGS. 7 and 8. The panel comprises coupling parts on its second pair of opposite edges, so that the panel can be coupled on its third edge 4 to the fourth edge 5 of another such panel, wherein the coupling parts comprise locking elements so that in the coupled state, locking occurs in the direction perpendicular to the surface of the coupled panels and locking occurs in the plane of the coupled panels and perpendicular to the coupled edges.

The coupling parts allow the panel to be coupled on its second pair of opposite edges 4, 5 by means of a downward motion M of the panel relative to the other such panel. The coupling parts comprise an upwards directed bottommost hook-shaped portion 66 on one of the edges of the second pair of opposite edges; and a downwards directed upper hook-shaped portion 67 that is located on the other, opposite edge of the second pair of opposite edges. The hook-shaped portions 66, 67 can be hooked in behind each other by means of the downward motion M, so that locking of the coupled panels is obtained in the direction parallel to the surface of the coupled panels and perpendicular to the coupled second pair of opposite edges. The lower hook-shaped portion 66 consists of a lip 68 with an upwards directed locking element 69, whereas the upper hook-shaped portion 67 consists of a lip 70 with a downwards directed locking element 71.

The coupling parts comprise locking elements in the form of locking surfaces, so that locking is also obtained in the direction perpendicular to the surface of the coupled panels. The panel of the example in FIG. 9 comprises an insert 72 that in the coupled state provides locking perpendicular to the surface of the coupled panels.

Figure 10:
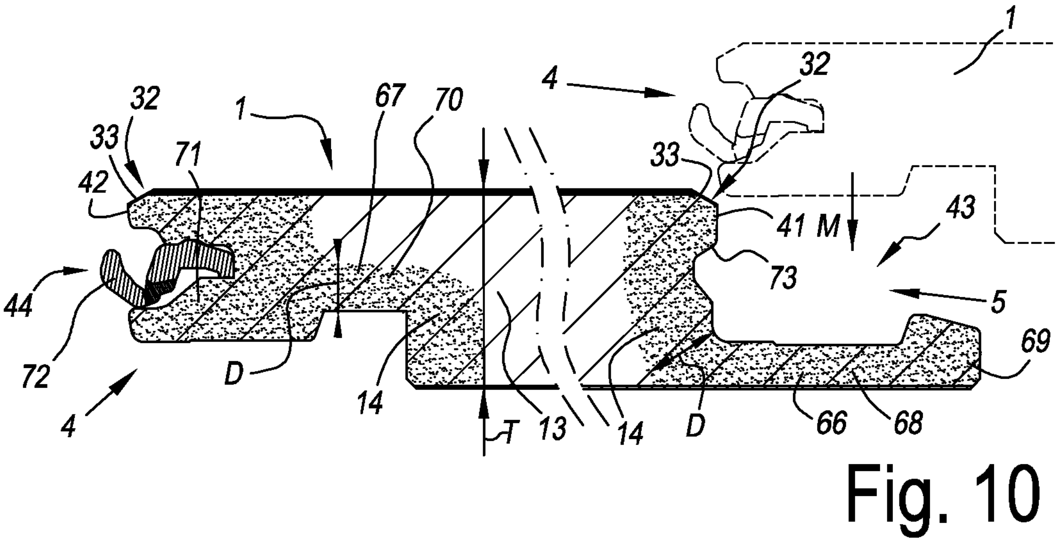

In FIG. 9, the insert is located in the edge 5 that comprises the upwards directed bottommost hook-shaped portion 66. Alternatively, it is also possible that the insert is located in the edge that comprises the downward directed upper hook-shaped portion 67. Such an example is shown in FIG. 10. The reference numbers here have the same meaning as in FIG. 9.

The coupling parts on the second pair of opposite edges may be configured as overlapping, so that during coupling on the second pair of opposite edges, coupling with pretension is obtained.

FIG. 9 illustrates that both edges of the second pair of opposite edges 4, 5 have been treated with a liquid, in the form of an impregnating agent 14. During application of this agent, it penetrates to a depth D in these edges of the panel 1. This penetration D, measured perpendicularly to the coupling parts 6, is for example more than 1 millimetre; or even more than 10 percent of the thickness T of the panel 1.

Both edges 4, 5 of the second pair of opposite edges comprise a lateral edge 43, 44 and a chamfer 32. These chamfers 32 were obtained by a milling operation. On both chamfers, a lacquer 33 has been applied, which provides colouring of these chamfers 32.

The lateral edges 43, 44 of the two edges 4, 5 of the second opposite pair of edges each comprise a sealing face 41, 42. These sealing faces 41, 42 are substantially perpendicular to the surface of the panel. In the coupled state of two panels, on their second pair of opposite edges 4, 5, the sealing faces 41, 42 come into contact with each other. In the example shown, impregnating agent 14 is applied, via the liquid, on the entire surface of both sealing faces 41, 42; this is in order to obtain good water repellence of the coupled panels.

Figure 11:
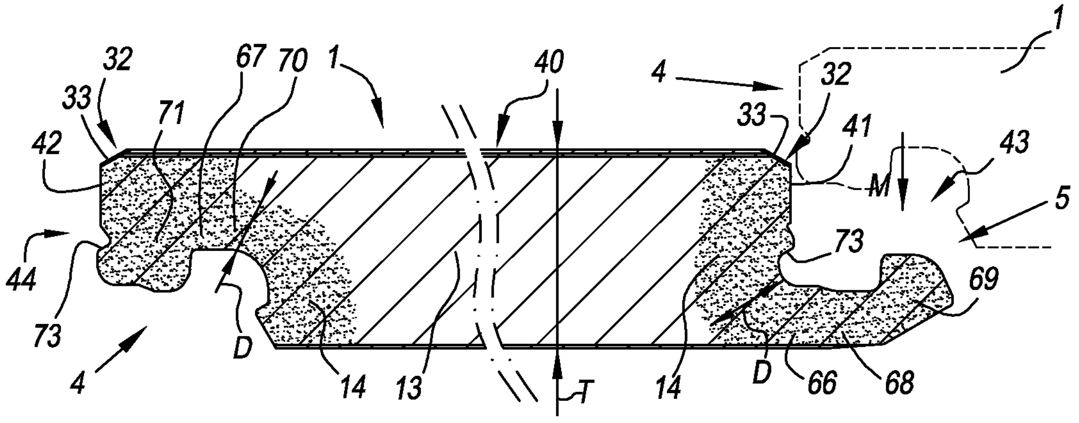
FIG. 11 shows another example of the second pair of opposite edges of a panel that may be used in the example of the floor covering in FIGS. 7 and 8.

FIG. 11 shows another example of the second pair of opposite edges of a panel that can be used in the example of the floor covering in FIGS. 7 and 8. The same reference numbers in FIG. 11 as in FIG. 9 have the same meaning. The essential difference between the examples in FIG. 9 and FIG. 10 is that the coupling parts, including the locking elements, are manufactured as one piece and completely from substrate, wherein the locking surfaces 73 for obtaining locking perpendicular to the surface of the panels, are formed in the substrate. Thus, in this example—in contrast to the examples in FIGS. 9 and 10—no use is made of a separate, additional insert for obtaining locking in the direction perpendicular to the plane of the panels.

Figure 12:
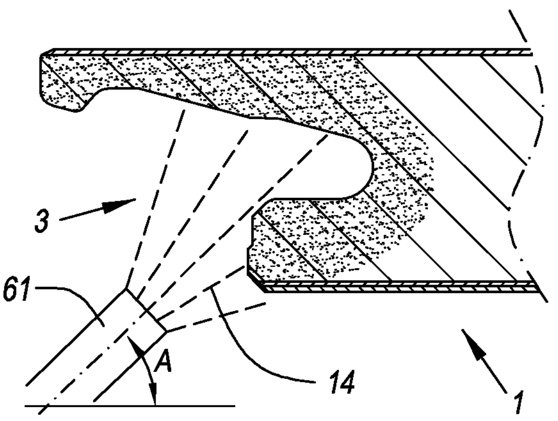
FIG. 12 illustrates the method according to the fifth aspect of the invention.

FIG. 12 illustrates an embodiment of the method according to the fifth aspect of the invention. A liquid 14—which will penetrate into the panel and can form an impregnating agent there—is applied by means of a spray head 61 on the second edge 3 of a panel 1, while the panels are led successively—but preferably with a clearance between successive panels—at constant speed past the spray head.

The spray head 61 is seen in the projection on the plane perpendicular to the second edge 3 and perpendicular to the direction of feed of the panels at an angle A of at least 2 degrees, preferably at least 5 degrees and more preferably less than 15 degrees, adjusted relative to the plane of the panel.

Preferably the liquid leaves the spray head 55 at a pressure above 3 bar, preferably above 4 bar, more preferably above 5 bar.

At the same time as the application of liquid on the second edge 3 as shown in FIG. 12, by means of one and the same type of arrangement, liquid can also be applied in a similar manner on the other edge of the first pair of opposite edges of the panel (i.e. on the first edge).

Figure 13:
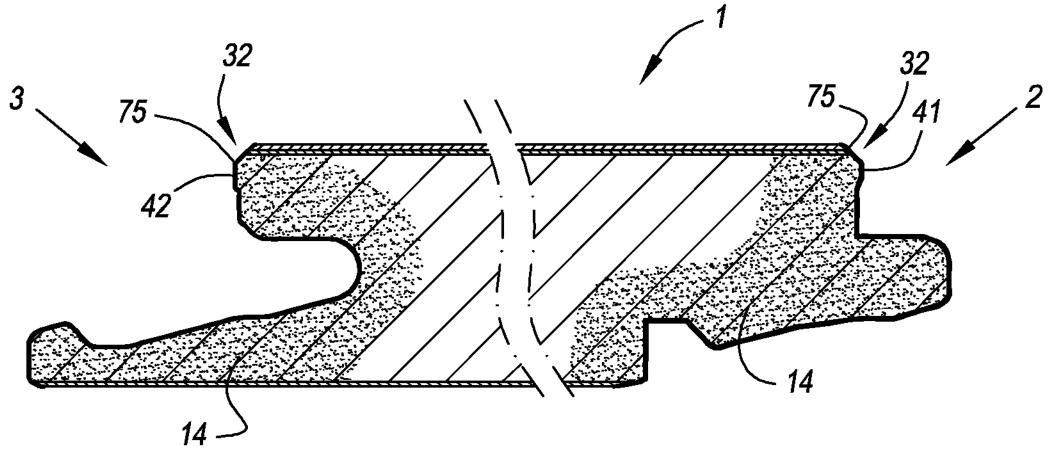
FIG. 13 illustrates the method according to the sixth aspect of the invention and a panel according to the sixteenth aspect of the invention.

FIG. 13 illustrates the method according to the sixth aspect of the invention and a panel according to the sixteenth aspect of the invention. The panel is shown on its first pair of opposite edges 2, 3; thus, in one and the same view as in FIG. 2. The same reference numbers have the same meaning as in FIG. 2. The first edge 2 and the second edge 3 have lowered edge regions in the form of chamfers 32. The first edge 2 and the second edge 3 are provided with an impregnating agent 14, which has been applied by means of a liquid. The impregnating agent imparts a water-repellent effect to the edges 2, 3. The impregnating agent also forms a surface layer 75 on and colouring of the surface of the lowered edge region and the whole edge where liquid has been applied. The colouring can be obtained because the liquid that has been applied on the edges comprises a liquid colourant. Because the chamfers are provided with a desired colour as a result, in these embodiments it is not necessary to apply a separate lacquer on the chamfers.

Since the complete edges 2, 3 have been impregnated with liquid, the sealing faces 41, 42 on both edges also comprise the impregnating agent 14 and the surface layer 75.

The second pair of opposite edges can be treated similarly.

Figure 14:
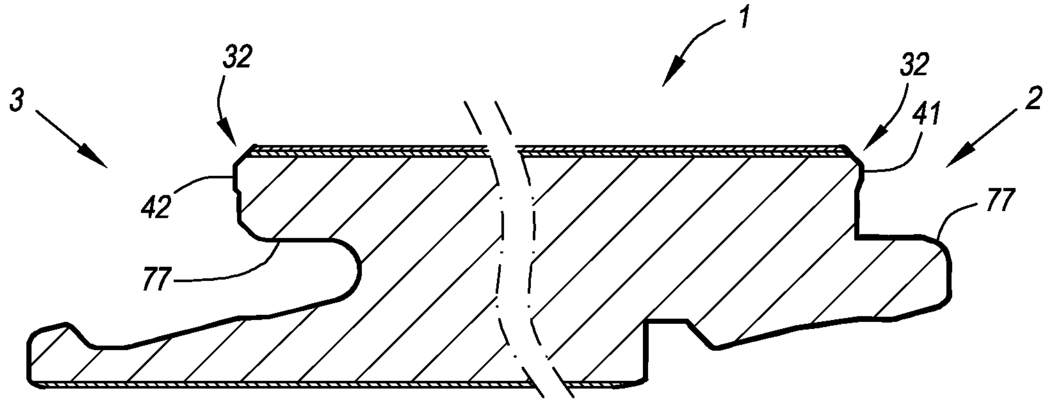
FIG. 14 illustrates the tenth aspect, eleventh aspect and fourteenth aspect of the invention.

FIG. 14 illustrates the tenth aspect, eleventh aspect and fourteenth aspect of the invention. The panel 1 is shown in one and the same view as in FIG. 2. The same reference numbers as in FIG. 2 have the same meaning. On the two edges 2, 3 of the first pair of opposite edges, a film 77 is formed. This may be a film-forming polymer layer or film-forming resin layer, which makes the respective edges vapour-tight; and/or imparts water-repellent properties to these edges. In the example, this film 77 has a thickness less than 50 micrometres, so that the geometry of the coupling parts is not disturbed.

The second pair of opposite edges of a rectangular panel can be treated in a similar manner as the first pair of opposite edges.

Figure 15:
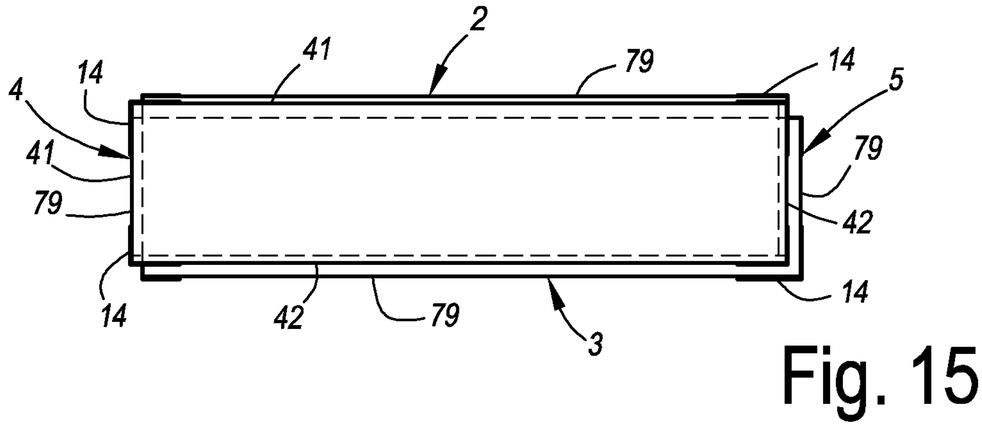
FIG. 15 illustrates an embodiment of the fifteenth aspect of the invention.

FIG. 15 illustrates an embodiment of the fifteenth aspect of the invention. A panel 1 is shown in top view. The panel 1 has a first pair of opposite edges 2, 3 and a second pair of opposite edges 3, 4. Both pairs of edges are provided with coupling parts for coupling such panels to a covering, for example a floor covering. On each of its four edges, the panel comprises sealing faces 41, 42, substantially perpendicular to the upper surface of the panel. The sealing faces of coupled edges come into contact with each other in the coupled state. The sealing faces 41, 42 are provided with an impregnating agent and/or coating 14, 79 over the entire length of the respective edge. However, the amount or concentration of impregnating agent or coating is higher near the corner points of the panel (where the impregnating agent or coating is indicated with reference 14) than in the middle of the length of the edges (where the impregnating agent or coating is indicated with reference 79).

In several of the aspects and embodiments, liquid is applied, which leads to formation of impregnation or impregnating agent in the panel. An example of a recipe for such a liquid comprises 8.4 wt % solid matter. Of this solid matter, 70 wt % is formed by a fluorinated acrylate copolymer (which partly comprises fluorinated methacrylate) and 30 wt % by an alkyd resin, more specifically in the example a "long-oil alkyd" resin. The combination of the fluorinated acrylate copolymer and the alkyd resin is solvent-borne, wherein the solvent is a combination of aliphatic hydrocarbons, dipropylene glycol methyl ether and a small amount of propylene glycol methyl ether acetate (a propyl acetate).

Using said recipe, it was found that the alkyd remains preferentially on the surface and forms a firmly adhering film there, whereas the fluorinated acrylate copolymer on the panel edges penetrates into the substrate more.

The invention further relates to various embodiments as presented in the numbered paragraphs hereunder.

1. Method for the manufacture of panels,
   wherein the panels (1) are rectangular, either square or oblong, wherein the panels comprise a substrate (13) and a top layer (40),
   wherein the panels (1) are provided with a first pair of opposite edges (2, 3), namely a first edge (2) and an opposite second edge (3), wherein the method comprises the steps:
   applying a liquid (14) on at least a part of the first edge (2), preferably wherein this liquid penetrates to a certain depth (D) in the respective edge,
   applying lacquer (33) on at least a part of the first edge while the liquid on the first edge is still in the wet state.
2. Method as in paragraph 1, wherein application of the liquid (14) and application of the lacquer (33) are carried out in the same continuous process.
3. Method as in paragraph 1 or 2, wherein the lacquer (33) is applied at least partly on a surface of the first edge on which liquid (14) has been applied.
4. Method as in any one of the preceding paragraphs, wherein the lacquer is applied by one of the methods:
   spraying of the lacquer,
   applying the lacquer by means of a transfer roller, or
   applying by means of a vacuum technique.
5. Method as in any one of the preceding paragraphs, wherein after application of the lacquer (33) the method comprises the step of blowing away, sucking away, or combined blowing away and sucking away of wet lacquer that had been applied on the upper surface of the panel during application of the lacquer on the first edge.
6. Method as in any one of the preceding paragraphs, wherein after application of the lacquer (33), the lacquer is dried, preferably in the same continuous process as application of the lacquer; preferably wherein during this drying, the liquid is also dried.
7. Method as in paragraph 6, wherein the lacquer (33) is dried by means of one or more IR lamps, preferably by means of one or more HIR lamps (halogen infrared lamps).
8. Method as in paragraphs 6 or 7, wherein during drying, a continuous gas stream—preferably a continuous air stream—flows over the surface of the panel to be dried, preferably wherein this gas stream is produced by means of a blowing device and/or a suction device.
9. Method as in paragraph 6, wherein the lacquer is dried by means of a hot gas stream—preferably by means of a hot air stream—wherein during this drying, the hot gas stream flows continuously over the surface of the panel to be dried, preferably wherein this gas stream is produced by means of a blowing device and/or a suction device.
10. Method as in any one of the preceding paragraphs, wherein the lacquer (33) is pigmented and/or comprises colourants.
11. Method as in any one of the preceding paragraphs, wherein the lacquer (33) is a water-based dispersion, preferably an acrylate dispersion or a polyurethane dispersion, or wherein the lacquer is or comprises an alkyd resin, or wherein the lacquer is solvent-based, preferably a solvent-based acrylate or a solvent-based polyurethane lacquer.
12. Method as in any one of the preceding paragraphs, wherein the liquid (14) is solvent-based, or wherein the liquid is water-based.
13. Method as in any one of the preceding paragraphs 1-11, wherein the liquid (14) is solvent-based, and wherein the solvent comprises one or more of a glycol ether, propylene glycol methyl ether, propylene glycol methyl ether acetate, hydrocarbons—preferably aliphatic hydrocarbons and/or preferably iso-hydrocarbons —, butyl acetate, propyl acetate—for example 3-methoxy-3-methyl-1-butyl acetate (MMB-AC) or 1-methoxy-propyl acetate (MPA)-, a dibasic ester, a glycol diether, a benzoate ester, or a tetramethoxy ether.

14. Method as in any one of the preceding paragraphs, wherein the liquid (14) is solvent-based, and wherein the solvent has a flash point above 30° C., preferably above 35° C., more preferably above 55° C.

15. Method as in any one of the preceding paragraphs, wherein the liquid (14) comprises one or more of an acrylate, a methacrylate, a fluorinated acrylate, a fluorinated methacrylate, a fluorinated acrylate copolymer, a (per)fluoroalkyl (meth)acrylate or a (per)fluoroalky (meth)acrylate copolymer, an alkyd, an epoxy resin, a fluorinated epoxy resin, a styrene acrylate, a urethane acrylate, an alkyd modified with polyurethane, an alkyd modified with fluorine, a styrene butadiene co-polymer or a polysiloxane; when using a (per)fluoroalkyl (meth) acrylate or a (per)fluoroalky (meth)acrylate copolymer, the fluorinated side chains preferably comprise four, five or six carbon atoms that comprise fluorine atoms and/or preferably at least some of the fluorinated side groups are based on perfluorobutane sulphonic acid 16. Method as in any one of the preceding paragraphs, wherein the liquid (14) comprises a fluoracrylate polymer with the structural formula i)
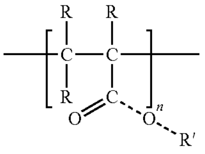

wherein one or more of the R groups are fluorine atoms, and the other R groups are hydrogen atoms;

or comprises a fluoracrylate polymer with the structural formula

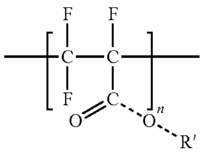

wherein, preferably, the R' group is free from hydrogen atoms, and is preferably selected from the list consisting of sodium, potassium, and $CF_3$.

17. Method as in any one of the preceding paragraphs, wherein the liquid (14) imparts water-repellent properties to the edge on which this liquid is applied.

18. Method as in any one of the preceding paragraphs, wherein the liquid (14) is applied by one of the following methods:

spraying, preferably at a pressure above 3 bar, preferably at a pressure above 5 bar, applying by means of a transfer roller, or applying by means of a vacuum technique, for example as described in DE9202976U1.

19. Method as in any one of the preceding paragraphs, wherein the first edge (2) comprises a lateral edge (43) of the panel (1) and a chamfer (32), wherein during application of the liquid (14), the liquid is applied at least on a part of the lateral edge (43) of the first edge (2), and wherein during application of the lacquer, the lacquer is applied at least on a part—and preferably on the entire—chamfer (32) of the first edge.

20. Method as in paragraph 19, wherein during application of the liquid (14) on at least a part of the lateral edge (43) of the first edge (2), liquid is also applied on at least a part of—and preferably on the entire—chamfer (32) of the first edge (2), so that during application of the lacquer (33) on the chamfer of the first edge, this takes place while the liquid (14) on the chamfer of the first edge is still in the wet state.

21. Method as in any one of the preceding paragraphs 19-20, wherein in a continuous process the chamfer (32) is formed on the first edge—preferably by processing by mechanical cutting, more preferably by a milling operation—and wherein application of the liquid and application of the lacquer are carried out in the same continuous process 22. Method as in any one of the preceding paragraphs 19-21, wherein the chamfer (32) does not comprise the top layer (40) at least over a part of its surface, so that over at least a part of the surface of the chamfer the lacquer is applied on the substrate (13).

23. Method as in any one of the preceding paragraphs, wherein the lateral edge (43) of the first edge (2) comprises a sealing face (41) substantially perpendicular to the upper surface of the panel, wherein the second edge (3) comprises a lateral edge (44), wherein the lateral edge (44) of the second edge (3) comprises a sealing face (42) substantially perpendicular to the upper surface of the panel, wherein the first edge of the panel can be coupled to the second edge of another such panel, wherein in the coupled state the sealing face (41) of the first edge of the panel comes into contact with or is located close to the sealing face (42) of the second edge of the other such panel; wherein during application of the liquid, the liquid is applied on at least a part—and preferably on the entire surface of—the sealing face (41) of the first edge.

24. Method as in any one of the preceding paragraphs, wherein in line with—and preferably parallel to—the carrying out of a step in the method on the first edge (2), a similar or the same step is carried out on the second edge (3), preferably wherein this occurs for several or all of the steps stated in the method.

25. Method as in any one of the preceding paragraphs, wherein the panels comprise coupling parts (6) on their first pair of opposite edges, wherein the coupling parts comprise locking elements (11, 12), so that the panel can be coupled on its first edge to the second edge of another such panel, wherein in the coupled state, locking occurs in the direction perpendicular to the surface of the coupled panels and locking also occurs in the plane of the coupled panels and perpendicular to the coupled edges; preferably wherein the coupling parts on the first pair of opposite edges are configured as overlapping, so that during coupling on the first pair of opposite edges, coupling with pretension is obtained.

26. Method as in paragraph 25, wherein the application of a liquid on at least a part of the first edge is carried out after and in line with the cutting operations—preferably milling operations—for making the coupling parts on the first edge of the panel.

27. Method as in any one of the preceding paragraphs, wherein the top layer comprises a decorative layer and a wearing layer, for example wherein the decorative layer comprises a printed layer of paper or a printed polymer film.
28. Method for the manufacture of panels, optionally a method as in any one of the preceding paragraphs 1-27, wherein the panels (1) are rectangular, either square or oblong, wherein the panels comprise a substrate (13) and a top layer (40), wherein the panels (1) are provided with a first pair of opposite edges (2, 3), namely a first edge (2) and an opposite second edge (3), wherein the panels (1) are provided with a second pair of opposite edges (4, 5), namely a third edge (4) and an opposite fourth edge (5), wherein the method comprises the step of applying a liquid (14) on at least a part of one, several or all of the first edge, the second edge, the third edge and the fourth edge by means of one or more spray heads (61), wherein the liquid leaves the one or more spray heads at a pressure above 3 bar, preferably above 4 bar, more preferably above 5 bar.

29. Method for the manufacture of panels, optionally as in any one of the preceding paragraphs 1-28;

wherein the panels (1) are rectangular, either square or oblong, wherein the panels comprise a substrate (13) and a top layer (40), wherein the panels (1) are provided with a first pair of opposite edges (2, 3), namely a first edge (2) and an opposite second edge (3), wherein the method comprises the step of applying a liquid (14) on at least a part of the first edge (2) and/or second edge (3) by means of one or more spray heads (61) while the panels are led successively—but preferably with a clearance between successive panels (1)—preferably at constant speed—past the one or more spray heads (61); wherein the position of the panels is detected directly or indirectly by means of a sensor, wherein the signal from the sensor—optionally together with the feed speed of the panels and/or the length of the panels in the direction of feed—is used for controlling, via a controller, the starting and stopping of the spraying of the one or more spray heads (61).

30. Method as in paragraph 29, wherein at least two spray heads (61) are operated for applying liquid (14) at least partly on the same surface of the panels.
31. Method as in any one of the preceding paragraphs 28-30, wherein at least one of the spray heads (61) is operated for applying liquid (14) also at least partly on an adjacent edge of the edge on which the spray head (61) applies liquid.
32. Method for the manufacture of panels, optionally as in any one of paragraphs 1-31, wherein the panels (1) are rectangular, either square or oblong, wherein the panels comprise a substrate (13) and a top layer (40), wherein the panels (1) are provided with a first pair of opposite edges (2, 3), namely a first edge (2) and an opposite second edge (3), wherein the method comprises the step of applying a liquid (14) on at least a part of the first edge (2) or second edge (3) by means of at least two spray heads (61) while the panels are led successively—but preferably with a clearance between successive panels—preferably at constant speed—past the at least two spray heads;

wherein at least one of the at least two spray heads seen in the projection on the plane of the panel is set at an angle relative to the plane of the panel, wherein this angle is less than 90°.

33. Method as in paragraph 32, wherein two of the at least two spray heads are installed so that a first spray head thereof is active in a direction with a component that is opposite to the direction of feed of the aforementioned panel (1); and a second spray head thereof is active in a direction with a component parallel to the direction of feed of the aforementioned panel (1).
34. Method as in any one of the preceding paragraphs 32-33, wherein at least two spray heads are used and wherein these two spray heads apply liquid at least partly on the same surface.
35. Method as in any one of the preceding paragraphs 32-34, wherein at least one of the spray heads is operated also to apply liquid at least partly on an adjacent edge of the edge on which the spray head applies liquid.
36. Method for the manufacture of panels, optionally as in any one of paragraphs 1-35, wherein the panels (1) are rectangular, either square or oblong, wherein the panels comprise a substrate (13) and a top layer (40), wherein the panels (1) are provided with a first pair of opposite edges (2, 3), namely a first edge (2) and an opposite second edge (3), wherein the method comprises the step of applying a liquid (14) on at least a part of the first edge (2) and/or second edge (3) by means of at least one spray head while the panels are led successively—but preferably with a clearance between successive panels—at constant speed past the one or more spray heads;

wherein at least one of the at least one spray head seen in the projection on the plane perpendicular to the first edge and perpendicular to the direction of feed of the panels is installed at an angle of at least 2 degrees, preferably at least 5 degrees and more preferably less than 15 degrees, relative to the plane of the panel.

37. Method as in any one of the preceding paragraphs 28-36, wherein at least one spray head also applies liquid on at least a part of an adjacent edge of the edge on which the spray head applies liquid.
38. Method for the manufacture of panels, optionally as in any one of the preceding paragraphs 28-37, wherein the panels (1) are rectangular, either square or oblong, wherein the panels comprise a substrate (13) and a top layer (40), wherein the panels (1) are provided with a first pair of opposite edges (2, 3), namely a first edge (2) and an opposite second edge (3), wherein the panel can be coupled on its first edge (2) to the second edge (3) of another such panel, wherein the first edge (2) is provided with a lowered edge region—for example in the form of a chamfer (32)—and a sealing face (41) substantially perpendicular to the surface of the panel; wherein the second edge (2) is provided with a lowered edge region—for example in the form of a chamfer (32)—and a sealing face (42) substantially perpendicular to the surface of the panel; wherein in the coupled state of the panel with its first edge (2) against the second edge (3) of another such panel, the sealing face (41) of the first edge of the panel comes into contact with or is located close to the sealing face (42) of the second edge of the other such panel, wherein the method comprises the step of applying a liquid (14) on the first edge and on the second edge, wherein the liquid penetrates at least partially into the sealing face of the first edge and sealing face of the second edge;

wherein the liquid at least forms a film on the lowered edge regions of the first edge and of the second edge.

39. Method as in paragraph 38, wherein the liquid comprises a pigment or colourant, so that a coloured film is formed on the lowered edge regions of the first edge and of the second edge.

40. Method as in any one of the preceding paragraphs 38-39, wherein on the lowered edge regions—for example formed by chamfers (32)—the liquid (14) is applied directly on the substrate at least for a part of the surface of the lowered edge regions.

41. Method as in any one of the preceding paragraphs 38-40, wherein on the lowered edge regions—for example formed by chamfers (32)—the liquid (14) penetrates into the substrate at least for a part of the surface of the lowered edge regions.

42. Method as in any one of the preceding paragraphs 38-41, wherein no other coating is applied on the lowered edge regions.

43. Method for the manufacture of panels, optionally as in any one of the preceding paragraphs 1-42, wherein the panels (1) are rectangular, either square or oblong, wherein the panels comprise a substrate (13) and a top layer (40), wherein the panels (1) are provided with a first pair of opposite edges (2, 3), namely a first edge (2) and an opposite second edge (3), wherein the panels (1) are provided with a second pair of opposite edges (4, 5), namely a third edge (4) and an opposite fourth edge (5), wherein the panels are provided with coupling parts on their first pair of opposite edges, so that a first such panel can be coupled on its first edge to the second edge of another such panel, preferably wherein locking occurs in the direction perpendicular to the coupled panels and/or in the direction in the plane of the panels perpendicular to the coupled edges, wherein the method comprises the steps:

step 1: applying a liquid (14) on at least a part (and preferably over the full length) of the first edge (2) and/or on a part (and preferably over the full length) of the second edge (3), preferably wherein this liquid penetrates to a certain depth (D) in the respective edge;

step 2: by means of one or more cutting operations, producing coupling parts on the second pair of opposite edges, so that a first such panel can be coupled on its third edge to the fourth edge of another such panel, preferably wherein locking occurs in the direction perpendicular to the coupled panels and/or in the direction in the plane of the panels perpendicular to the coupled edges; and optional step 3: applying a liquid (14) on at least a part—and preferably over the full length—of the third edge (4) and/or on a part—and preferably over the full length—of the fourth edge (5), preferably wherein this liquid penetrates to a certain depth (D) in the respective edge, preferably wherein more liquid is applied on the third edge and the fourth edge, per unit of surface area, than in step 1 on the first edge and the second edge.

44. Method as in paragraph 43, wherein step 3 is carried out; wherein in step 3, liquid (14) is also applied on the first edge (2) and/or on the second edge (3) over a certain length from the corner point with an edge of the second pair of opposite edges on which liquid is applied in step 3.

45. Method as in any one of paragraphs 43-44, wherein the first edge and/or the second edge comprise a lowered edge region, preferably in the form of a chamfer (32), wherein before or after step 1, but preferably before step 2, a lacquer (33) is applied on this lowered edge region, preferably wherein the lacquer is an acrylate lacquer, a polyurethane lacquer or comprises an alkyd;

preferably wherein the lacquer comprises pigments or colourants so that the lowered edge is coloured.

46. Method as in paragraph 45, wherein application of the lacquer is followed by blowing away and/or sucking away of lacquer that might have been applied on the upper surface of the panel before step 2.

47. Method as in paragraph 45-46, wherein the lacquer is dried before carrying out step 2.

48. Method for the manufacture of panels, optionally as in any one of the preceding paragraphs 28-37 or 43-47, wherein the panels (1) are rectangular, either square or oblong, wherein the panels comprise a substrate (13) and a top layer (40), wherein the panels (1) are provided with a first pair of opposite edges (2, 3), namely a first edge (2) and an opposite second edge (3), wherein the first edge and/or the second edge comprise a lowered edge region, for example a chamfer (32), wherein the method comprises the steps:

applying a lacquer (33) on the surface of the lowered edge region(s);

optionally drying—and optionally crosslinking—of the lacquer on the lowered edge region(s);

applying a liquid (14) at least on the part of the first edge (2) and/or second edge (3) directly adjacent to the lowered edge region(s), preferably wherein this liquid penetrates to a certain depth (D) in the respective edge.

49. Method as in paragraph 48, wherein the liquid penetrates at least partially into the respective edge so that a part of the liquid is located in the substrate under the lacquer on the lowered edge region.

50. Method as in any one of the preceding paragraphs 48-49, wherein the lateral edge (43) of the first edge (2) comprises a sealing face (41) substantially perpendicular to the upper surface of the panel, wherein the second edge (3) comprises a lateral edge (44), wherein the lateral edge (44) of the second edge (3) comprises a sealing face (42) substantially perpendicular to the upper surface of the panel, wherein the first edge of the panel can be coupled to the second edge of another such panel, wherein in the coupled state the sealing face (41) of the first edge of the panel comes into contact with or is located close to the sealing face (42) of the second edge of the other such panel;

wherein during application of the liquid, the liquid is applied on at least a part—and preferably on the entire surface—of the sealing face (41, 42) of the first edge and/or second edge.

51. Method as in paragraph 50, wherein the sealing face (41) of the first edge is directly adjacent to the lowered edge region of the first edge (2), wherein the sealing face (42) of the second edge is directly adjacent to the lowered edge region of the second edge (3), wherein liquid is also applied on the part of the sealing face(s) directly adjacent to the lowered edge region(s) on which liquid (14) is applied.

52. Method for the manufacture of panels, optionally as in any one of paragraphs 1-51,
wherein the panels (1) are rectangular, either square or oblong, wherein the panels comprise a substrate (13) and a top layer (40),
wherein the panels (1) are provided with a first pair of opposite edges (2, 3), namely a first edge (2) and an opposite second edge (3),
wherein the panels (1) are provided with a second pair of opposite edges (4, 5), namely a second edge (4) and an opposite fourth edge (5),
wherein a liquid is applied on at least one of the first edge, the second edge, the third edge and the fourth edge—and preferably on several of these edges; and more preferably on all of these edges—over at least a part of their surface, and preferably over their entire surface;
wherein a plurality of these panels are packed together without an active drying treatment being carried after application of the liquid.
53. Method as in paragraph 52, wherein a plurality of these panels, after application of the liquid, are packed together before the liquid has dried completely.
54. Method for the manufacture of panels, optionally as in any one of the preceding paragraphs 1-53,
wherein the panels (1) are rectangular, either square or oblong, wherein the panels comprise a substrate (13) and a top layer (40),
wherein the panels (1) are provided with a first pair of opposite edges (2, 3), namely a first edge (2) and an opposite second edge (3),
wherein the method comprises the step of wet application of a film-forming polymer layer (77) or film-forming resin layer at least on one of the first edge or the second edge, wherein this film-forming polymer layer (77) or film-forming resin layer makes the respective edge(s) vapour-tight.
55. Method as in paragraph 54, wherein the method comprises the step of applying a liquid (14) at least on one of the first edge or the second edge, —preferably wherein liquid is applied on the surface on which the film-forming polymer layer or the film-forming resin layer has already been applied —, wherein this liquid makes the respective edge(s) water-repellent.
56. Method for the manufacture of panels, optionally as in any one of the preceding paragraphs 1-53,
wherein the panels (1) are rectangular, either square or oblong, wherein the panels comprise a substrate (13) and a top layer (40),
wherein the panels (1) are provided with a first pair of opposite edges (2, 3), namely a first edge (2) and an opposite second edge (3),
wherein the method comprises the steps:
applying a liquid (14) on the first edge and/or the second edge, wherein this liquid penetrates to a certain depth (D) in the respective edge;
wet application of a film-forming polymer layer (77) or film-forming resin layer on the edge or edges on which the liquid has been applied.
57. Method as in paragraph 56, wherein the liquid imparts water-repellent properties to the respective edge.
58. Method as in any one of the preceding paragraphs 56-57, wherein the polymer film or the film-forming resin layer makes the respective edge vapour-tight.
59. Method as in any one of the preceding paragraphs 56-58, wherein the liquid is water-based or solvent-based.
60. Method as in any one of the preceding paragraphs 56-59, wherein wet application of the polymer film or film-forming resin layer is water-based or solvent-based.
61. Method as in any one of the preceding paragraphs 54-60, wherein the film-forming polymer layer or the film-forming resin layer forms a film with a thickness less than 50 micrometres, preferably less than 25 micrometres.
62. Method as in any one of the preceding paragraphs 54-61, wherein the film formed by the film-forming polymer layer or the film-forming resin layer imparts vapour-tight properties and/or water-repellent properties to the respective edge(s).
63. Method as in any one of the preceding paragraphs 54-62, wherein the film-forming polymer layer or film-forming resin layer is applied by means of a water-based emulsion or a water-based dispersion.
64. Method as in any one of the preceding paragraphs 54-63, wherein the film-forming polymer layer or the film-forming resin layer comprises or is formed by an alkyd—preferably a polyurethane-modified alkyd —, an acrylate, a polyurethane, a polysiloxane, a styrene acrylate, a urethane acrylate, an alkyd modified with fluorine or a styrene-butadiene copolymer.
65. Method as in any one of the preceding paragraphs 54-64, wherein the film-forming polymer layer or the film-forming resin layer comprises clay; for example, in the form of nanoclay and/or for example montmorillonite clay.
66. Method for the manufacture of panels, optionally as in any one of the preceding paragraphs 1-65,
wherein the panels (1) are rectangular, either square or oblong, wherein the panels comprise a substrate (13) and a top layer (40),
wherein the panels (1) are provided with a first pair of opposite edges (2, 3), namely a first edge (2) and an opposite second edge (3), wherein the method comprises the steps:
applying a liquid (14) on at least a part of the first edge (2) and/or second edge (3), preferably wherein this liquid penetrates to a certain depth (D) in the respective edge,
drying the liquid on the first edge (2) and/or the second edge (3) by means of one or more HIR lamps (halogen infrared lamps).
67. Method as in paragraph 66, wherein during drying, a continuous gas stream—preferably a continuous air stream—flows over the surface of the panel to be dried, preferably wherein this gas stream is produced by means of a blowing device and/or a suction device.
68. Method for the manufacture of panels, optionally as in any one of the preceding paragraphs 1-67,
wherein the panels (1) are rectangular, either square or oblong, wherein the panels comprise a substrate (13) and a top layer (40),
wherein the panels (1) are provided with a first pair of opposite edges (2, 3), namely a first edge (2) and an opposite second edge (3), wherein the method comprises the steps of applying a liquid (14) on at least a part of the first edge (2) and/or second edge, preferably wherein this liquid penetrates to a certain depth (D) in the respective edge,
wherein the liquid (14) comprises one or more of an acrylate, a methacrylate, a fluorinated acrylate, a fluorinated methacrylate, a fluorinated acrylate copolymer, an alkyd, an epoxy resin, a fluorinated epoxy resin, a styrene acrylate, a urethane acrylate, an alkyd modified with polyurethane, an alkyd modified with fluorine, a styrene butadiene copolymer or a polysiloxane.

69. Method as in paragraph 68, wherein the liquid comprises one or more of a fluorinated acrylate, a fluorinated methacrylate, or a fluorinated acrylate copolymer; preferably wherein this or these comprise(s) perfluorobutane sulphonic acid-based active side chains.

70. Method as in any one of the preceding paragraphs 68-69, wherein the liquid is water-based, or wherein the liquid is solvent-based.

71, Method as in any one of the preceding paragraphs 68-70, wherein the liquid (14) is solvent-based, and preferably wherein the solvent comprises one or more of a glycol ether, propylene glycol methyl ether, propylene glycol methyl ether acetate, hydrocarbons—preferably aliphatic hydrocarbons and/or preferably iso-hydrocarbons —, butyl acetate, propyl acetate—for example 3-methoxy-3-methyl-1-butyl acetate (MMB-AC) or 1-methoxy-propyl acetate (MPA)-, a dibasic ester, a glycol diether, a benzoate ester, or a tetramethoxy ether.

72. Method as in any one of the preceding paragraphs 68-71, wherein the solvent comprises both a polar solvent and a non-polar solvent, preferably wherein the polar solvent comprises a butyl acetate and/or a propyl acetate.

73. Method as in paragraph 72, wherein the non-polar solvent is or comprises a hydrocarbon preferably an aliphatic hydrocarbon, more preferably an aliphatic iso-hydrocarbon.

74. Method as in any one of the preceding paragraphs 72-73, wherein the polar solvent comprises one or more of an alcohol, a glycol ether, for example one or more of propylene glycol methyl ether, propylene glycol methyl ether acetate, butyl acetate, propyl acetate—for example 3-methoxy-3-methyl-1-butyl acetate (MMB-AC) or 1-methoxy-propyl acetate (MPA)-, a dibasic ester, a glycol diether, a benzoate ester, or a tetramethoxy ether.

75. Method as in any one of the preceding paragraphs 68-74, wherein the liquid (14) is solvent-based, and wherein the solvent has a flash point above 30° C., preferably above 35° C., more preferably above 55° C.

76. Method as in any one of the preceding paragraphs 68-75, wherein the liquid is solvent-based, wherein the solvents and optional additives in the liquid are exclusively of the aliphatic type, or, the proportion of solvent and optional additive of the aromatic type in the liquid is less than 1000 ppm, or less than 100 ppm.

77. Method as in any one of the preceding paragraphs 68-75, wherein the percentage by weight of solid matter in the liquid is less than 15%, preferably less than 10%.

78. Method as in any one of the preceding paragraphs 68-77, wherein the liquid comprises a liquid colourant, preferably wherein the liquid does not comprise any solid pigments.

79. Method as in any one of the preceding paragraphs 68-78, wherein the liquid comprises on the one hand an alkyd resin—preferably a urethane or isocyanate modified alkyd resin and/or a "long oil alkyd"—and on the other hand one or more of a fluorinated acrylate, a fluorinated methacrylate, a styrene acrylate, a urethane acrylate, a styrene butadiene copolymer or a fluorinated acrylate copolymer.

80. Method as in paragraph 79, wherein in the liquid, the ratio of the solid matter of on the one hand the one or more of the fluorinated acrylate, fluorinated methacrylate, styrene acrylate, urethane acrylate, styrene butadiene copolymer or fluorinated acrylate copolymer to on the other hand the alkyd resin is higher than 2, and preferably lower than 5, more preferably lower than 4, more preferably lower than 3.

81. Method as in any one of the preceding paragraphs 68-80, wherein the liquid (14) imparts water-repellent properties to the edge on which this liquid is applied.

82. Method as in any one of the preceding paragraphs 1-81, wherein the liquid penetrates to a certain depth (D), preferably more than 1 millimetre, in the respective edge.

83. Method as in any one of the preceding paragraphs 1-82, wherein the first edge (2) comprises a sealing face (41) substantially perpendicular to the upper surface of the panel;

wherein the second edge (3) comprises a sealing face (42) substantially perpendicular to the upper surface of the panel, wherein the first edge of the panel can be coupled to the second edge of another such panel, wherein in the coupled state the sealing face (41) of the first edge of the panel comes into contact with or is located close to the sealing face (42) of the second edge of the other such panel;

wherein during application of the liquid, on at least a part in the direction perpendicular to the upper surface—and preferably on the entire surface in the direction perpendicular to the upper surface of the panel—the liquid is applied on the sealing face (41) of the first edge and on the sealing face (42) of the second edge.

84. Method as in any one of the preceding paragraphs 1-83, wherein the panels comprise a second pair of opposite edges, namely a third edge (4) and a fourth edge (5), wherein the third edge (4) comprises a sealing face (41) substantially perpendicular to the upper surface of the panel;

wherein the fourth edge (5) comprises a sealing face (42) substantially perpendicular to the upper surface of the panel, wherein the third edge of the panel can be coupled to the third edge of another such panel, wherein in the coupled state the sealing face (41) of the third edge of the panel comes into contact with or is located close to the sealing face (42) of the fourth edge of the other such panel;

wherein during application of the liquid, on at least a part in the direction perpendicular to the upper surface—and preferably on the entire surface in the direction perpendicular to the upper surface of the panel—the liquid is applied on the sealing face (41) of the third edge and on the sealing face (42) of the fourth edge.

85. Method as in any one of the preceding paragraphs 1-84, wherein the panels comprise a second pair of opposite edges, namely a third edge (4) and a fourth edge (5), wherein one or more or all of the first edge, the second edge, the third edge and the fourth edge comprise a lowered edge, for example in the form of a chamfer (32), wherein, where liquid is applied on the edge(s), it is also applied on the lowered edge on this edge if said lowered edge is present.

86. Method as in any one of the preceding paragraphs 1-85, wherein the panels comprise a second pair of opposite edges, namely a third edge (4) and a fourth edge (5), wherein one or more or all of the first edge, the second edge, the third edge and the fourth edge comprise a lowered edge, for example in the form of a chamfer (32), wherein the method comprises the step of applying lacquer on the lowered edge, wherein if liquid is applied on the edge that comprises the lowered edge, application of the lacquer may take place before or after application of the liquid on the respective edge.

87. Method as in paragraph 86, wherein application of the liquid and application of the lacquer on one or more of the first edge, second edge, third edge and/or fourth edge take place in the same continuous process.

88. Method as in any one of the preceding paragraphs 1-87, wherein the substrate is selected from or comprises:

a wood fibre board, for example an MDF (Medium Density Fibreboard) or HDF (High Density Fibreboard) board, or a chipboard, or a mineral board, for example a magnesium oxide board, a plasterboard, a board made from mineral fibres bonded with a binder (for example by means of a thermosetting binder), or a fibre-cement board, or a polymer-based substrate, for example such as a filled or unfilled and/or foamed polyvinyl chloride-based substrate or a substrate based on some other thermoplastic or thermosetting polymer.

89. Method as in any one of the preceding paragraphs 1-88, wherein the panels comprise a decorative top layer, wherein the decorative top layer (16) comprises a print, preferably wherein the decorative top layer (16) is fastened directly or indirectly on an underlying substrate (15), or wherein the decorative top layer (16) comprises a wood veneer (thickness less than 2.5 mm) or a layer of wood (thickness starting from 2.5 mm), wherein an optional wood veneer preferably has a thickness between 0.4 and 0.8 mm.

90. Method as in any one of the preceding paragraphs 1-89, wherein the panel (1) is provided with a first pair of opposite edges (2, 3), namely a first edge (2) and an opposite second edge (3), wherein the panel comprises coupling parts (6) on its first pair of opposite edges, so that the panel can be coupled on its first edge to the second edge of another such panel, wherein the coupling parts comprise locking elements (11, 12) so that in the coupled state, locking occurs in the direction perpendicular to the surface of the coupled panels and/or locking occurs in the plane of the coupled panels and perpendicular to the coupled edges; preferably wherein the coupling parts on the first pair of opposite edges are configured as overlapping, so that during coupling on the first pair of opposite edges, coupling with pretension is obtained.

91. Method as in any one of the preceding paragraphs 1-90, wherein the panels are floor panels.

92. Panel, wherein the panel (1) is rectangular, either square or oblong, wherein the panel comprises a substrate (13) and a top layer (40), wherein the panels (1) are provided with a first pair of opposite edges (2, 3), namely a first edge (2) and an opposite second edge (3), wherein the panels comprise coupling parts (6) on their first pair of opposite edges, so that the panel can be coupled on its first edge to the second edge of another such panel, wherein the surface of at least one of the first edge and the second edge—and preferably both of the first edge and of the second edge—of the panel comprise a film (77)—preferably a polymer film or a film formed by a resin layer —, wherein the film has a thickness less than 50 micrometres, preferably less than 25 micrometres.

93. Panel as in paragraph 92, wherein the film provides vapour-tight properties and/or water-repellent properties for the respective edge(s).

94. Panel as in any one of the preceding paragraphs 92-93, wherein the polymer film or the film formed by a resin layer is applied by means of a water-based emulsion or a water-based dispersion.

95. Panel as in any one of the preceding paragraphs 92-94, wherein the film (77) comprises or is formed by an alkyd—preferably a polyurethane-modified alkyd —, an acrylate, a polyurethane, a polysiloxane, a styrene acrylate, a urethane acrylate, an alkyd modified with fluorine or a styrene-butadiene copolymer.

96. Panel as in any one of the preceding paragraphs 92-95, wherein the film comprises clay, for example in the form of nanoclay and/or preferably montmorillonite clay.

97. Panel, wherein the panel (1) is rectangular, either square or oblong, wherein the panel comprises a substrate (13) and a top layer (40), wherein the panel (1) is provided with a first pair of opposite edges (2, 3), namely a first edge (2) and an opposite second edge (3), wherein the panel comprises coupling parts (6) on its first pair of opposite edges, so that the panel can be coupled on its first edge to the second edge of another such panel, preferably wherein the coupling parts comprise locking elements (11, 12) so that in the coupled state, locking occurs in the direction perpendicular to the surface of the coupled panels and/or locking occurs in the plane of the coupled panels and perpendicular to the coupled edges;

preferably wherein the coupling parts on the first pair of opposite edges are configured as overlapping, so that during coupling on the first pair of opposite edges, coupling with pretension is obtained;

wherein the panel (1) is provided with a second pair of opposite edges (4, 5), namely a third edge (4) and an opposite fourth edge (5), wherein the panels comprise coupling parts on their second pair of opposite edges so that the panel can be coupled on its third edge to the fourth edge of another such panel, preferably wherein the coupling parts comprise locking elements so that in the coupled state, locking occurs in the direction perpendicular to the surface of the coupled panels and/or locking occurs in the plane of the coupled panels and perpendicular to the coupled edges; preferably wherein the coupling parts are configured as overlapping on the second pair of opposite edges, so that during coupling on the second pair of opposite edges, coupling with pretension is obtained;

wherein each of the first edge (2), the second edge (3), the third edge (4) and the fourth edge (5) comprises a sealing face (41), substantially perpendicular to the upper surface of the panel, wherein in the coupled state of the panel with its first edge (2) against the second edge (3) of another such panel, the sealing face of the first edge of the panel is in contact with or is close to the sealing face of the second edge of the other such panel;

wherein in the coupled state of the panel with its third edge (4) against the fourth edge (5) of another such panel, the sealing face of the third edge of the panel is in contact with or is close to the sealing face of the fourth edge of the other such panel;

wherein the sealing faces of the third edge and of the fourth edge, from each of the four corner points of the panel towards the middle of respectively the third edge and the fourth edge, at least over a certain distance from the respective corner point, are provided with an impregnating agent and/or a coating;

wherein the average concentration of the impregnating agent and/or coating over this defined distance is higher than the average of the concentration of impregnating agent and/or coating on the sealing faces in the middle of the first edge and the second edge.

98. Panel as in paragraph 97, wherein the panel is elongated, and wherein the first pair of opposite edges (2, 3) form the long edges of the panel.

99. Panel as in any one of the preceding paragraphs 97-98, wherein the sealing faces of the first edge and of the second edge from each of the four corner points of the panel towards the middle of respectively the first edge and the second edge at least over a certain distance from the respective corner point, are provided with impregnating agent and/or coating;

wherein the average concentration of the impregnating agent and/or coating over this defined distance is higher than the average of the concentration of impregnating agent and/or coating on the sealing faces in the middle of the first edge and the second edge.

100. Panel as in any one of paragraphs 98-99, wherein the sealing faces of the first edge and second edge are not provided with impregnating agent or coating over a certain length in the middle of the respective edge.

101. Panel as in any one of paragraphs 97-100, wherein the sealing faces of the third edge and of the fourth edge are provided with impregnating agent and/or coating over the full length of the respective edge.

102. Panel as in any one of paragraphs 97-100, wherein the sealing faces of the third edge and of the fourth edge are not provided with impregnating agent and/or coating over the full length of the respective edge, preferably wherein the sealing faces of the third edge and fourth edge are not provided with the impregnating agent and/or the coating over a certain length in the middle of their length.

103. Panel as in any one of the preceding paragraphs 97-102, wherein one, several or all of the first edge (2), the second edge (3), the third edge (4) and the fourth edge (5) are provided with a lowered edge region, for example in the form of a chamfer (32), preferably wherein the lowered edge region(s) is/are provided with a lacquer (33), more preferably wherein the lacquer is or comprises an acrylate lacquer, a polyurethane lacquer or an alkyd and/or wherein the lacquer comprises pigment or colourant.

104. Panel, optionally a panel as in any one of the preceding paragraphs 92-103, wherein the panel (1) is rectangular, either square or oblong, wherein the panel comprises a substrate (13) and a top layer (40), wherein the panel (1) is provided with a first pair of opposite edges (2, 3), namely a first edge (2) and an opposite second edge (3), wherein the panel comprises coupling parts (6) on its first pair of opposite edges, so that the panel can be coupled on its first edge to the second edge of another such panel, wherein the first edge is provided with a lowered edge region, preferably in the form of a chamfer (32), wherein the first edge comprises an impregnating agent, on at least a part of—and preferably on the entire—lowered edge region and on at least part of the first edge below and directly adjacent to the lowered edge region, wherein the impregnating agent provides a water-repellent effect where it has been applied on the first edge; and at the same time provides a surface layer on and colouring of the surface of the lowered edge region.

105. Panel as in paragraph 104, wherein each of the first edge (2) and the second edge (3) comprises a sealing face (41, 42) substantially perpendicular to the surface of the panel; wherein in the coupled state of the panel with its first edge (2) against the second edge (3) of another such panel, the sealing face (41) of the first edge of the panel comes into contact with or is located close to the sealing face (42) of the second edge of the other such panel; wherein the sealing face of the first edge comprises the impregnating agent at least over its upper part—and preferably over its entire surface.

106. Panel as in paragraph 105, wherein the sealing face of the first edge is immediately adjacent to the lowered edge region of the first edge.

107. Panel, optionally a panel as in any one of the preceding paragraphs 92-106, wherein the panel (1) is rectangular, either square or oblong, wherein the panel comprises a substrate (13) and a top layer (40), wherein the panel (1) is provided with a first pair of opposite edges (2, 3), namely a first edge (2) and an opposite second edge (3), wherein the panel comprises coupling parts (6) on its first pair of opposite edges, so that the panel can be coupled on its first edge to the second edge of another such panel, wherein the first edge comprises an impregnating agent (14).

108. Panel as in paragraph 107, wherein the impregnating agent comprises one or more of a fluorinated acrylate, a fluorinated methacrylate, or a fluorinated acrylate copolymer; preferably wherein this or these comprise(s) perfluorobutane sulphonic acid-based active side chains.

109. Panel as in any one of the preceding paragraphs 107-108, wherein the impregnating agent comprises a colourant.

110. Panel as in any one of the preceding paragraphs 107-109, wherein the impregnating agent comprises on the one hand an alkyd resin—preferably a urethane or isocyanate modified alkyd resin and/or preferably a "long oil alkyd"—and on the other hand one or more of a fluorinated acrylate, a fluorinated methacrylate, a fluorinated acrylate copolymer, a styrene acrylate, a urethane acrylate, or a styrene butadiene copolymer.

111. Panel as in paragraph 110, wherein in the impregnating agent the ratio of on the one hand the solid matter of the one or more of a fluorinated acrylate, a fluorinated methacrylate, a fluorinated acrylate copolymer, a styrene acrylate, a urethane acrylate, or a styrene butadiene copolymer to on the other hand the solid matter of the alkyd resin is higher than 2, and preferably lower than 5, more preferably lower than 4, more preferably lower than 3.

112. Panel as in any one of the preceding paragraphs 110-111, wherein the impregnating agent has penetrated into the substrate to a certain extent, wherein there is a gradient of the weight ratio of alkyd resin relative to the total of alkyd resin and the one or more of a fluorinated acrylate, a fluorinated methacrylate, a fluorinated acrylate copolymer, a styrene acrylate, a urethane acrylate, or a styrene butadiene copolymer over the impregnation depth, wherein the weight ratio of alkyd is higher on the surface of the substrate.

113. Panel as in any one of the preceding paragraphs 110-112, wherein the alkyd resin is mainly located on or near the surface of the zone where the impregnating agent has been applied.

114. Panel as in any one of the preceding paragraphs 107-113, wherein the impregnating agent imparts water-repellent properties to the edge on which this impregnating agent is applied.

115. Panel as in any one of the preceding paragraphs 92-114, wherein the panel is elongated, and wherein the first pair of opposite edges (2, 3) form the long edges of the panel.

116. Panel as in any one of the preceding paragraphs 92-115, wherein the panel comprises coupling parts (6) on its first pair of opposite edges (2, 3), so that the panel can be coupled on its first edge (2) to the second edge (3) of another such panel, preferably wherein the coupling parts comprise locking elements (11, 12) so that in the coupled state, locking occurs in the direction perpendicular to the surface of the coupled panels and/or locking occurs in the plane of the coupled panels and perpendicular to the coupled edges;

preferably wherein the coupling parts on the first pair of opposite edges are configured as overlapping, so that during coupling on the first pair of opposite edges, coupling with pretension is obtained;

wherein the panel (1) is provided with a second pair of opposite edges (4, 5), namely a third edge (4) and an opposite fourth edge (5), wherein the panels comprise coupling parts on their second pair of opposite edges so that the panel can be coupled on its third edge to the fourth edge of another such panel, preferably wherein the coupling parts comprise locking elements so that in the coupled state, locking occurs in the direction perpendicular to the surface of the coupled panels and/or locking occurs in the plane of the coupled panels and perpendicular to the coupled edges; preferably wherein the coupling parts are configured as overlapping on the second pair of opposite edges, so that during coupling on the second pair of opposite edges, coupling with pretension is obtained.

117. Panel as in paragraph 116, wherein each of the first edge (2), the second edge (3), the third edge (4) and the fourth edge (5) comprises a sealing face (41, 42), substantially perpendicular to the upper surface of the panel, wherein in the coupled state of the panel with its first edge (2) against the second edge (3) of another such panel, the sealing face (41) of the first edge of the panel comes into contact with or is located close to the sealing face (42) of the second edge of the other such panel;

wherein in the coupled state of the panel with its third edge (4) against the fourth edge (5) of another such panel, the sealing face (41) of the third edge of the panel comes into contact with or is located close to the sealing face (42) of the fourth edge of the other such panel.

118. Panel as in any one of the preceding paragraphs 92-115, wherein the coupling parts of the first pair of opposite edges (2, 3) are produced substantially in the form of a tongue (7) and a groove (8), which in the coupled state provide locking in the direction perpendicular to the plane of the coupled panels, wherein the tongue (7) and the groove (8) are provided with locking elements (11, 12), which in the coupled state of two such panels on their first pair of opposite edges provide locking in the direction in the plane of the panels and perpendicular to the coupled edges, wherein the groove is delimited by an upper lip (10) and a lower lip (9), preferably wherein the lower lip projects farther in the distal direction than the upper lip, wherein the lower lip (10) comprises a locking element (11) in the form of an upwards directed locking element for interacting with a locking element (12) on the underside of the tongue (7) for forming locking in the direction in the plane of the panels and perpendicular to the coupled edges.

119. Panel as in any one of the preceding paragraphs 92-118, wherein the panel can be coupled on its first edge (2) to the second edge (3) of another such panel by means of a turning motion (R) and/or by pushing the panels together with a snap effect substantially parallel to the plane of the panels.

120. Panel as in any one of the preceding paragraphs 92-119, wherein the second pair of opposite edges (4, 5) comprises coupling parts that allow the panel to be coupled to another such panel by means of a downward motion (M) of the panel relative to the other such panel;

wherein the coupling parts of the second pair of opposite edges, in the coupled state of two such panels, form a first locking system on their second pair of opposite edges that provides locking in the plane of the coupled panels and perpendicular to the coupled edges; and form a second locking system in the direction perpendicular to the coupled panels;

wherein the first locking system is formed at least by an upwards directed bottommost hook-shaped portion (66) that is located on one of the aforementioned second pair of opposite edges, as well as a downwards directed upper hook-shaped portion (67) that is located on the other, opposite edge of the aforementioned second pair of opposite edges, and said hook-shaped portions can be hooked-in behind each other by means of the aforementioned downward motion (M); wherein the lower hook-shaped portion (66) consists of a lip (68) with an upwards directed locking element (69), whereas the upper hook-shaped portion (67) consists of a lip (70) with a downwards directed locking element (71);

wherein the second locking system has locking elements in the form of locking surfaces, optionally wherein the second locking system comprises an insert or wherein the second locking system is made completely of material of the substrate.

121. Panel as in any one of the preceding paragraphs 92-120, wherein a plurality of such panels (1) can be installed by the fold-down method wherein a covering, for example a floor covering is formed.

122. Panel as in any one of the preceding paragraphs 92-119, wherein the coupling parts of the second pair of opposite edges (4, 5) are produced substantially in the form of a tongue and a groove, which in the coupled state provide locking in the direction perpendicular to the plane of the coupled panels, wherein the tongue and the groove are provided with locking elements which in the coupled state of two such panels on their second pair of opposite edges provide locking in the direction in the plane of the panels and perpendicular to the coupled edges, wherein the groove is delimited by an upper lip and a lower lip, preferably wherein the lower lip projects farther in the distal direction than the upper lip, wherein the lower lip comprises a locking element in the form of an upwards directed locking element for interacting with a locking element on the underside of the tongue for forming locking in the direction in the plane of the panels and perpendicular to the coupled edges;

preferably wherein the coupling parts are configured as overlapping on the second pair of opposite edges, so that during coupling on the second pair of opposite edges, coupling with pretension is obtained.

123. Panel as in any one of the preceding paragraphs 92-122, wherein one, several or all of the first edge (2), the second edge (3), the third edge (4) and the fourth edge (5) are provided with a lowered edge region, for example in the form of a chamfer (32), preferably wherein the lowered edge region(s) is/are provided with a lacquer (33), more preferably wherein the lacquer is or comprises an acrylate lacquer, a polyurethane lacquer or an alkyd and/or wherein the lacquer comprises pigment or colourant.

124. Panel as in any one of the preceding paragraphs 97-123, wherein each of the first edge (2) and the second edge (3) comprises a sealing face (41, 42) substantially perpendicular to the surface of the panel; wherein in the coupled state of the panel with its first edge (2) against the second edge (3) of another such panel, the sealing face (41) of the first edge of the panel comes into contact with or is located close to the sealing face (42) of the second edge of the other such panel; wherein the sealing face of the first edge comprises impregnating agent at least over its upper part—and preferably over its entire surface.

125. Panel as in paragraphs 123 and 124, wherein the sealing face of the first edge (41) is immediately adjacent to the lowered edge region of the first edge.

126. Panel as in any one of the preceding paragraphs 97-125, wherein the impregnating agent penetrates to a certain depth (D) in the edge where the impregnating agent has been applied, preferably wherein this depth is at least 1 millimetre.

127. Panel as in any one of the preceding paragraphs 92-126, wherein the substrate is selected from or comprises:

a wood fibre board, for example an MDF (Medium Density Fibreboard) or HDF (High Density Fibreboard) board, a chipboard, a mineral board, for example a magnesium oxide board, a plasterboard, a board made from mineral fibres bonded with a binder (for example by means of a thermosetting binder), or a fibre-cement board, a polymer-based substrate, for example such as a filled or unfilled and/or foamed polyvinyl chloride-based substrate or a substrate based on some other thermoplastic or thermosetting polymer.

128. Panel as in any one of the preceding paragraphs 92-127, wherein the panel comprises a decorative top layer, wherein the decorative top layer (16) comprises a print, preferably wherein the decorative top layer (16) is fastened directly or indirectly on an underlying substrate (15), or wherein the decorative top layer (16) comprises a wood veneer (thickness <2.5 mm) or a layer of wood (thickness starting from 2.5 mm), wherein an optional wood veneer preferably has a thickness from 0.4 to 0.8 mm.

129, Panel as in any one of the preceding paragraphs 92-128, wherein the panel is a floor panel.

The present invention is by no means limited to the embodiments described above, but said methods for the manufacture of panels and said panels can be realized while remaining within the scope of the present invention.

The invention claimed is:

1. A method for manufacturing panels, wherein said panels are rectangular, either square or oblong, wherein the panels comprise a substrate and a decorative top layer, wherein the substrate comprises a wood fibre board and wherein the decorative top layer comprises a print, wherein the panels are provided with a first pair of opposite edges, namely a first edge and an opposite second edge, and a second pair of opposite edges, namely a third edge and a fourth edge, wherein one or more or all of the first edge, the second edge, the third edge and the fourth edge comprise a lowered edge region in a form of a chamfer, wherein the method comprises a step of applying a liquid on at least a part of the first edge and/or second edge, said part including said lowered edge, wherein the liquid comprises one or more of an acrylate, a methacrylate, a fluorinated acrylate, a fluorinated methacrylate, a fluorinated acrylate copolymer, an alkyd, an epoxy resin, a fluorinated epoxy resin, a styrene acrylate, a urethane acrylate, an alkyd modified with polyurethane, an alkyd modified with fluorine, a styrene butadiene copolymer or a polysiloxane.

2. The method according to claim 1, wherein the liquid comprises one or more of a fluorinated acrylate, a fluorinated methacrylate, or a fluorinated acrylate copolymer.

3. The method according to claim 1, wherein the liquid is water-based, or wherein the liquid is solvent-based.

4. The method according to claim 1, wherein the liquid is solvent-based, and comprises one or more of a glycol ether, propylene glycol methyl ether, propylene glycol methyl ether acetate, hydrocarbons, butyl acetate, propyl acetate, a dibasic ester, a glycol diether, a benzoate ester, or a tetramethoxy ether.

5. The method according to claim 1, wherein the liquid is solvent-based, wherein the solvent comprises both a polar solvent and a non-polar solvent.

6. The method according to claim 1, wherein a percentage by weight of solid matter in the liquid is less than 15%.

7. The method according to claim 1, wherein the liquid comprises a liquid colourant.

8. The method according to claim 1, wherein the liquid comprises solid pigments.

9. The method according to claim 1, wherein the liquid comprises an alkyd resin and one or more of a fluorinated acrylate, a fluorinated methacrylate, a styrene acrylate, a urethane acrylate, a styrene butadiene copolymer or a fluorinated acrylate copolymer.

10. The method according to claim 9, wherein the alkyd resin is a urethane or isocyanate modified alkyd resin and/or a long oil alkyd.

11. The method according to claim 9, wherein, in the liquid, a ratio of the solid matter of the one or more of the fluorinated acrylate, fluorinated methacrylate, styrene acrylate, urethane acrylate, styrene butadiene copolymer or fluorinated acrylate copolymer to the alkyd resin is higher than 2.

12. The method according to claim 11, wherein, in the liquid, a ratio of the solid matter of one or more of the fluorinated acrylate, fluorinated methacrylate, styrene acrylate, urethane acrylate, styrene butadiene copolymer or fluorinated acrylate copolymer to the alkyd resin is lower than 5.

13. The method according to claim 1, wherein the liquid imparts water-repellent properties to the edge upon which said liquid is applied.

14. The method according to claim 1, wherein the panel comprises coupling parts on the first pair of opposite edges, so that the panel can be coupled on the first edge of the panel to the second edge of another such panel, wherein the coupling parts comprise locking elements so that in a coupled state of coupled panels including said panel and said another such panel, locking occurs in a direction perpendicular to a surface of the coupled panels and/or locking occurs in a plane of the coupled panels and perpendicular to the coupled edges including the first edge of the panel and the second edge of the another such panel.

15. The method according to claim 14, wherein the coupling parts on the first pair of opposite edges are configured as overlapping, so that during coupling on the first pair of opposite edges, coupling with pretension is obtained.

16. The method according to claim 1, wherein said liquid comprises a pigment or colourant and forms a coloured film on said lowered edge region of the first edge and of the second edge.

17. The method according to claim 16, wherein said lowered edge regions are free from other coatings.

18. The method according to claim 1, wherein said liquid is applied by means of a transfer roller or a vacuum technique.

19. The method according to claim 1, wherein said first edge comprises a sealing face substantially perpendicular to an upper surface of the panel; and the second edge comprises a sealing face substantially perpendicular to the upper surface of the panel, wherein the first edge of the panel can be coupled to the second edge of another such panel, wherein in a coupled state including the panel and another such panel, the sealing face of the first edge of the panel is in contact with or is close to the sealing face of the second edge of the other such panel;

wherein during application of the liquid, the liquid on at least a part in a direction perpendicular to the upper surface is applied on the sealing face of the first edge and on the sealing face of the second edge.

20. The method according to claim 19, wherein the sealing face of the first edge is immediately adjacent to the lowered edge region of the first edge and wherein the sealing face of the second edge is immediately adjacent to the lowered edge region of the second edge.

21. A method for manufacturing panels, wherein said panels are rectangular, either square or oblong, wherein the panels comprise a substrate and a decorative top layer, wherein the substrate comprises a wood fibre board and wherein the decorative top layer comprises a print, wherein the panels are provided with a first pair of opposite edges, namely a first edge and an opposite second edge, and a second pair of opposite edges, namely a third edge and a fourth edge, wherein one or more or all of the first edge, the second edge, the third edge and the fourth edge comprise a lowered edge region in a form of a chamfer, wherein the method comprises a step of applying a liquid on at least a part of the first edge and/or second edge, said part including said lowered edge, wherein the liquid comprises one or more of an acrylate, a methacrylate, a fluorinated acrylate, a fluorinated methacrylate, a fluorinated acrylate copolymer, an alkyd, an epoxy resin, a fluorinated epoxy resin, a styrene acrylate, a urethane acrylate, an alkyd modified with polyurethane, an alkyd modified with fluorine, a styrene butadiene copolymer or a polysiloxane, wherein the liquid is water-based and wherein the liquid comprises solid pigments.

22. The method according to claim 21, wherein the liquid imparts water-repellent properties to the edge upon which said liquid is applied.

23. The method according to claim 22, wherein the liquid forms a coloured film on said lowered edge region of the first edge and of the second edge.

24. The method according to claim 23, wherein said first edge comprises a sealing face substantially perpendicular to an upper surface of the panel; and the second edge comprises a sealing face substantially perpendicular to the upper surface of the panel, wherein the first edge of the panel can be coupled to the second edge of another such panel, wherein in the coupled state including the panel and another such panel, the sealing face of the first edge of the panel is in contact with or is close to the sealing face of the second edge of the other such panel;

wherein during application of the liquid, the liquid on at least a part in a direction perpendicular to the upper surface is applied on the sealing face of the first edge and on the sealing face of the second edge.

* * * * *